(12) United States Patent
Lee et al.

(10) Patent No.: US 11,747,933 B2
(45) Date of Patent: *Sep. 5, 2023

(54) SCREEN OUTPUT METHOD USING EXTERNAL DEVICE AND ELECTRONIC DEVICE FOR SUPPORTING THE SAME

(71) Applicant: Samsung Electronics Co., Ltd., Gyeonggi-do (KR)

(72) Inventors: Jeong Pyo Lee, Gyeonggi-do (KR); Young Kyu Seon, Gyeonggi-do (KR); Ga Jin Song, Gyeonggi-do (KR); Dong Ho Jang, Gyeonggi-do (KR); Hyung Sup Byeon, Gyeonggi-do (KR); Yong Joon Jeon, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/382,464

(22) Filed: Jul. 22, 2021

(65) Prior Publication Data

US 2021/0357068 A1 Nov. 18, 2021

Related U.S. Application Data

(63) Continuation of application No. 15/938,067, filed on Mar. 28, 2018, now Pat. No. 11,119,601.

(30) Foreign Application Priority Data

Mar. 29, 2017 (KR) ........................ 10-2017-0040004

(51) Int. Cl.
*G06F 3/041* (2006.01)
*G06F 3/04886* (2022.01)
(Continued)

(52) U.S. Cl.
CPC .......... *G06F 3/0416* (2013.01); *G06F 1/1626* (2013.01); *G06F 3/03547* (2013.01);
(Continued)

(58) Field of Classification Search
CPC .. G06F 3/0416; G06F 1/1626; G06F 3/03547; G06F 3/0412; G06F 3/04162;
(Continued)

(56) References Cited

U.S. PATENT DOCUMENTS 9,178,977 B2 11/2015 Konishi
9,223,414 B2 12/2015 Jeong et al.
(Continued)

FOREIGN PATENT DOCUMENTS

CN 101661372 A 3/2010
CN 103677711 A 3/2014
(Continued)

OTHER PUBLICATIONS

Grant of Patent dated Feb. 8, 2022.
Chinese Office Action dated Feb. 28, 2023.

*Primary Examiner* — Quoc A Tran
(74) *Attorney, Agent, or Firm* — Cha & Reiter, LLC

(57) ABSTRACT

An electronic device is provided. The electronic device includes a display for receiving a touch input, a communication circuit, at least one processor, and a memory. The memory stores instructions executable by the at least one processor to detect whether the electronic device is in communication with an external display device via the communication circuit, transmit data for rendering an extended user interface on the external display device to the external display device via the communication circuit, detect whether the electronic device is connected with an external pointing device via the communication circuit, and, when the external pointing device is not connected to the elec-
(Continued)

tronic device, provide at least a portion of the display for use as a pointing device.

22 Claims, 15 Drawing Sheets

(51) Int. Cl.
| | | |
|---|---|---|
| *G06F 3/14* | (2006.01) | |
| *G06F 9/451* | (2018.01) | |
| *G06F 21/31* | (2013.01) | |
| *G06F 1/16* | (2006.01) | |
| *G06F 3/0354* | (2013.01) | |
| *G06F 3/04812* | (2022.01) | |
| *G06F 3/04883* | (2022.01) | |
| *G06F 3/0488* | (2022.01) | |
| *G06F 21/32* | (2013.01) | |
| *G06F 3/0481* | (2022.01) | |
| *G06F 17/00* | (2019.01) | |

(52) U.S. Cl.
CPC .......... *G06F 3/0412* (2013.01); *G06F 3/0488* (2013.01); *G06F 3/04162* (2019.05); *G06F 3/04812* (2013.01); *G06F 3/04883* (2013.01); *G06F 3/04886* (2013.01); *G06F 3/1423* (2013.01); *G06F 3/1454* (2013.01); *G06F 9/452* (2018.02); *G06F 21/31* (2013.01); *G06F 21/32* (2013.01); *G06F 3/03543* (2013.01); *G06F 3/0481* (2013.01); *G06F 3/1431* (2013.01); *G06F 3/1438* (2013.01); *G06F 2200/1614* (2013.01); *G06F 2203/04803* (2013.01); *G09G 2330/021* (2013.01); *G09G 2340/14* (2013.01); *G09G 2370/12* (2013.01); *G09G 2370/16* (2013.01); *G09G 2380/02* (2013.01)

(58) Field of Classification Search
CPC .............. G06F 3/04812; G06F 3/0488; G06F 3/04883; G06F 3/04886; G06F 3/1423; G06F 3/1454; G06F 9/452; G06F 21/31; G06F 21/32; G06F 3/0481; G06F 2203/04803; G06F 3/1438; G06F 3/03543; G06F 3/041; G06F 3/1431; G06F 2200/1614; G09G 2330/021; G09G 2340/14; G09G 2370/12; G09G 2370/16; G09G 2380/02
See application file for complete search history.

(56) References Cited

U.S. PATENT DOCUMENTS

| | | |
|---|---|---|
| 9,442,624 B2 | 9/2016 | Yang et al. |
| 9,734,779 B2 | 8/2017 | Forutanpour et al. |
| 9,880,642 B2 | 1/2018 | Jeong et al. |
| 10,331,342 B2 | 6/2019 | Choi et al. |
| 10,802,708 B2 | 10/2020 | Lee et al. |
| 2009/0153540 A1* | 6/2009 | Blinzer ............... G06F 1/3265 345/212 |
| 2009/0322693 A1 | 12/2009 | Sasakura |
| 2012/0315887 A1 | 12/2012 | Konishi |
| 2013/0241829 A1 | 9/2013 | Kim |
| 2014/0075377 A1* | 3/2014 | Kang ............... G06F 3/04842 715/788 |
| 2014/0139431 A1 | 5/2014 | Tseng et al. |
| 2014/0184510 A1 | 7/2014 | Jeong et al. |
| 2014/0191960 A1* | 7/2014 | Jeong ............ H04N 21/42204 345/157 |
| 2015/0116218 A1 | 4/2015 | Yang et al. |
| 2015/0135108 A1* | 5/2015 | Pope ................. G06F 3/04897 715/767 |
| 2015/0192989 A1 | 7/2015 | Kim et al. |
| 2015/0193613 A1* | 7/2015 | Kim ..................... G06F 21/36 726/19 |
| 2016/0216852 A1 | 7/2016 | Lee et al. |
| 2016/0240154 A1 | 8/2016 | Forutanpour et al. |
| 2017/0025055 A1 | 1/2017 | Kim et al. |
| 2017/0150227 A1 | 5/2017 | Kim et al. |
| 2018/0196596 A1* | 7/2018 | Choi ...................... G06F 3/147 |
| 2022/0164091 A1 | 5/2022 | Kang et al. |

FOREIGN PATENT DOCUMENTS

| | | |
|---|---|---|
| CN | 103914253 A | 7/2014 |
| CN | 104765446 A | 7/2015 |
| CN | 105930073 A | 9/2016 |
| EP | 2 866 165 A1 | 4/2015 |
| JP | 2010-009533 A | 1/2010 |
| JP | 2012-257156 A | 12/2012 |
| JP | 2016-38619 A | 3/2016 |
| KR | 10-2013-0085604 A | 7/2013 |
| KR | 10-2013-0105044 A | 9/2013 |
| KR | 10-2014-0034025 A | 3/2014 |
| KR | 10-2014-0088446 A | 7/2014 |
| KR | 10-2014-0089874 A | 7/2014 |
| WO | 2016/130213 A1 | 8/2016 |
| WO | 2017-022931 A1 | 2/2017 |

* cited by examiner

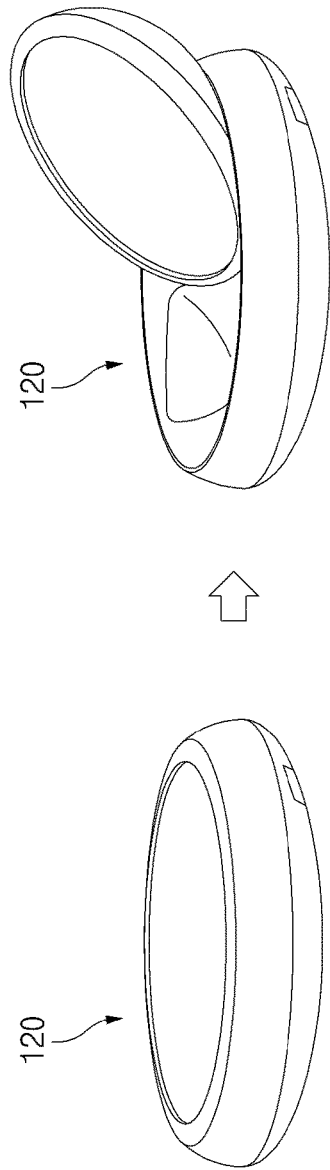
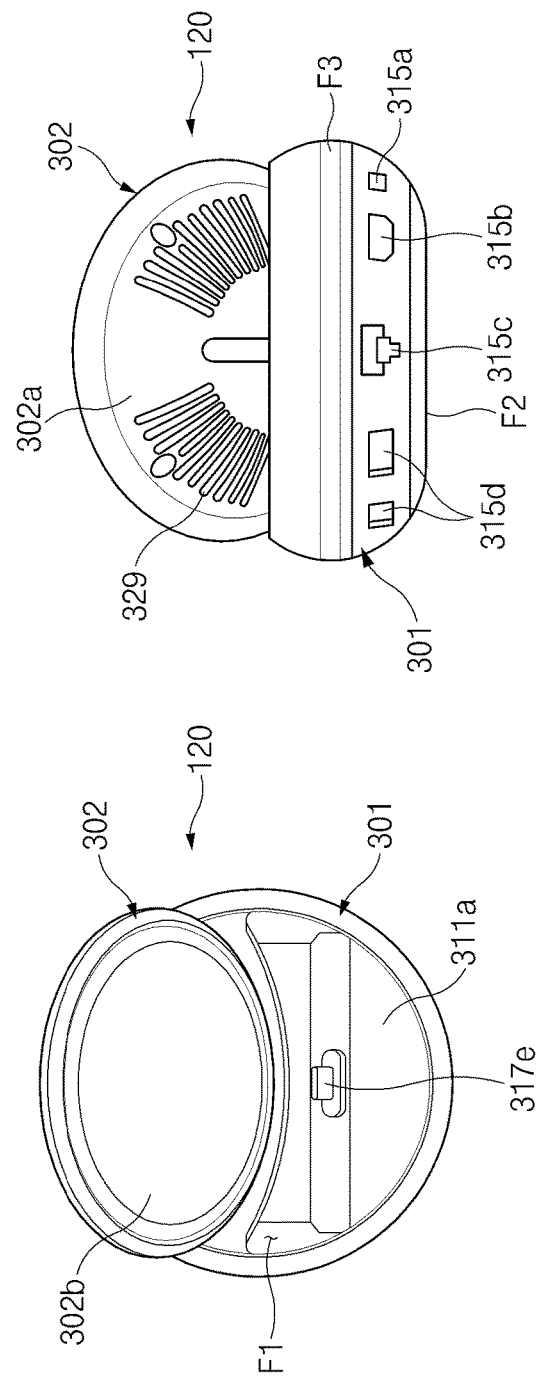
FIG.3A

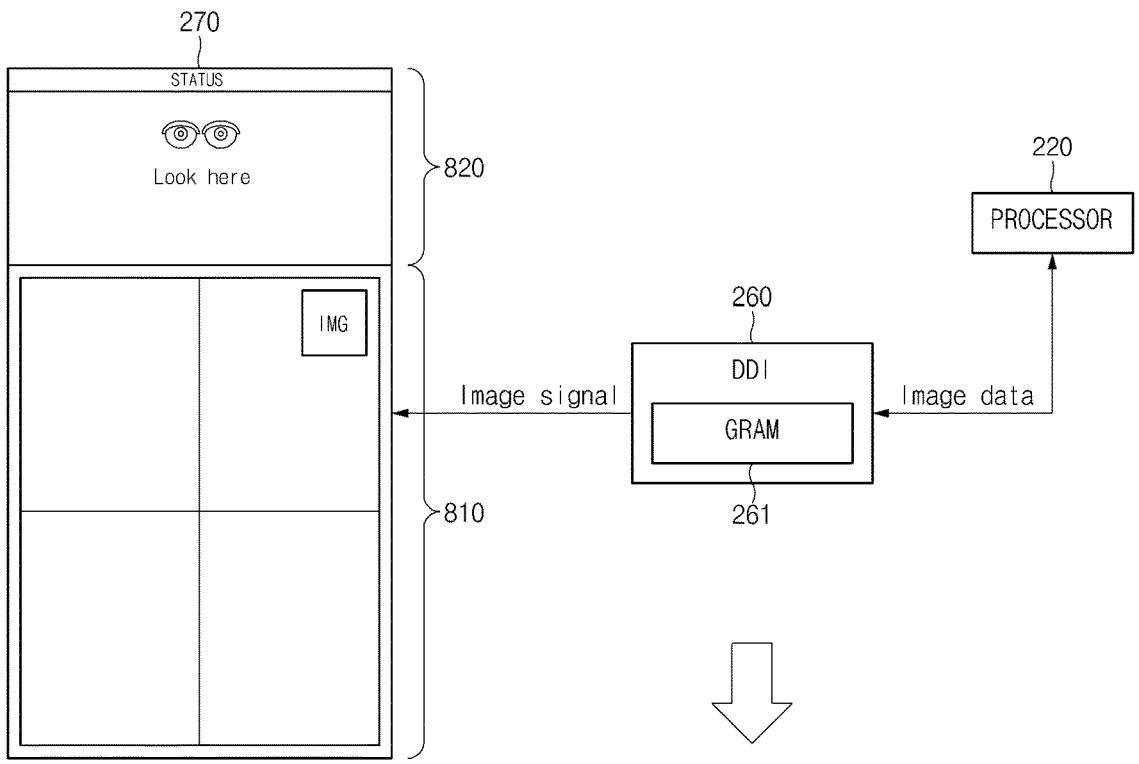
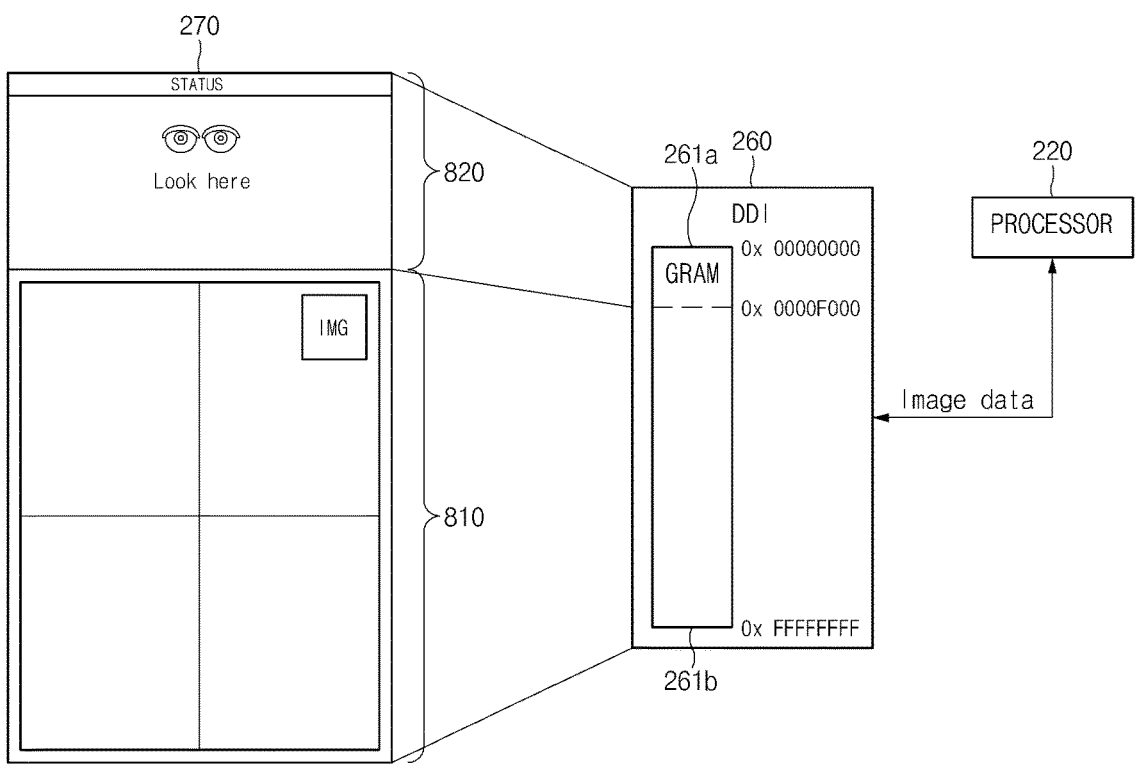
FIG.11

SCREEN OUTPUT METHOD USING EXTERNAL DEVICE AND ELECTRONIC DEVICE FOR SUPPORTING THE SAME

CROSS-REFERENCE TO RELATED APPLICATION(S)

This application is a Continuation of Ser. No. 15/938,067 filed on Mar. 28, 2018 which is based on and claims priority under 35 U.S.C. § 119 to Korean Patent Application No. 10-2017-0040004, filed on Mar. 29, 2017, in the Korean Intellectual Property Office, the disclosure of which is incorporated by reference herein its entirety.

BACKGROUND

The present disclosure relates to a method for outputting a screen on an external display device and an electronic device for supporting the same.

TECHNICAL FIELD

There has been an increase in the use of mobile electronic devices such as smartphones, tablet personal computers (PCs), and wearable devices. The electronic device may perform a variety of functions such as call, wireless communication, video playback, or web search, etc. on such devices. The electronic device may be utilized independently, or utilized while connected to an external display device (e.g., a monitor, a television "TV", or the like). For example, the electronic device may be wiredly or wirelessly connected to a monitor or a TV, and may output content (e.g., an image, a text, or the like) to the external display device.

The above information is presented as background information to assist with an understanding of the present disclosure. No determination has been made, and no assertion is made, as to whether any of the above might be applicable as prior art with regard to the present disclosure.

SUMMARY

An environment where a mobile electronic device is used or an operating system (OS) of the mobile electronic device may differ from an environment where a desktop or laptop PC is used or an OS of the desktop or laptop PC. The mobile electronic device may have a relative small display and may output content in the form of being suitable for the small display. On the other hand, a device like a desktop or laptop PC may have a relative large display and may provide a large amount of content to a user at the same time.

When the mobile electronic device is connected to an external display device such as a TV or a monitor to output its content, the content may be output by a mirroring scheme. Recently, the mobile electronic device may provide a reconfigured screen different from its screen to the external display device to enhance convenience of the user.

When the mobile electronic device interworks with an external input device such as an external mouse or an external keyboard, it may provide a user input which uses the external input device to the external display device. When the mobile electronic device does not interwork with the external input device such as the external mouse or the external keyboard, it may provide a touch input on a display to the external display device. In this case, the user should execute an application or should select an icon, through a touch operation of the mobile electronic device.

Aspects of the present disclosure are to address at least the above-mentioned problems and/or disadvantages and to provide at least the advantages described below. Accordingly, an aspect of the present disclosure is to provide an electronic device for detecting whether connected with an external pointing device and operating at least a portion of a touch display as a touchpad and a screen output method.

In accordance with an aspect of the present disclosure, an electronic device is provided. The electronic device may include a housing including a first surface and a second surface facing an opposite direction from the first surface, a display configured to receive a touch input, the display exposed through at least a portion of the first surface, a communication circuit disposed in the housing, at least one processor disposed in the housing and electrically connected with the display and the communication circuit, and a memory disposed in the housing and electrically connected with the at least one processor, wherein the memory stores instructions executable to cause the at least one processor to: detect whether the electronic device is in communication with an external display device via the communication circuit, transmit data for rendering an extended user interface on the external display device to the external display device via the communication circuit, detect whether the electronic device is connected with an external pointing device via the communication circuit, and when the external pointing device is not connected to the electronic device, provide at least a portion of the display for use as a pointing device.

In accordance with one aspect of the invention, an electronic device is disclosed, including a display configured to receive a touch input, a communication circuit, a processor, and a memory, the processor configured to: detect a connection with an external display device via the communication circuit, detect whether a specified external pointing device is connected to the electronic device via the communication circuit, and when the external pointing device is not connected to the electronic device, operate at least a portion of the display as a pointing device.

In accordance with one aspect of the invention, a screen output method in an electronic device capable connection with an external display device is disclosed, the method including detecting whether the electronic device is communicatively connected with the external display device via a communication circuit of the electronic device, transmitting data for rendering an extended user interface on the external display device to the external display device via the communication circuit, detecting whether the electronic device is connected with an external pointing device via the communication circuit, and when the external pointing device is not connected to the electronic device, providing at least a portion of the display for use as a pointing device.

The electronic device and the screen output method according to various embodiments of the present disclosure may operate a portion of a display of the electronic device as an input device depending on a state of a peripheral device (e.g., a mouse or a keyboard) connected to the electronic device and a state where an application is executed, when the mobile electronic device is connected to a PC, a monitor, or a TV to be used.

The electronic device and the screen output method according to various embodiments of the present disclosure may provide a portion of a display of the electronic device as an input device and may provide an output of a user interface through the other of the display.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3A is a drawing illustrating a configuration of a mediation device according to various embodiments;

FIG. 11 is a drawing illustrating an image output in a division output mode according to various embodiments;

DETAILED DESCRIPTION

Figure 1:
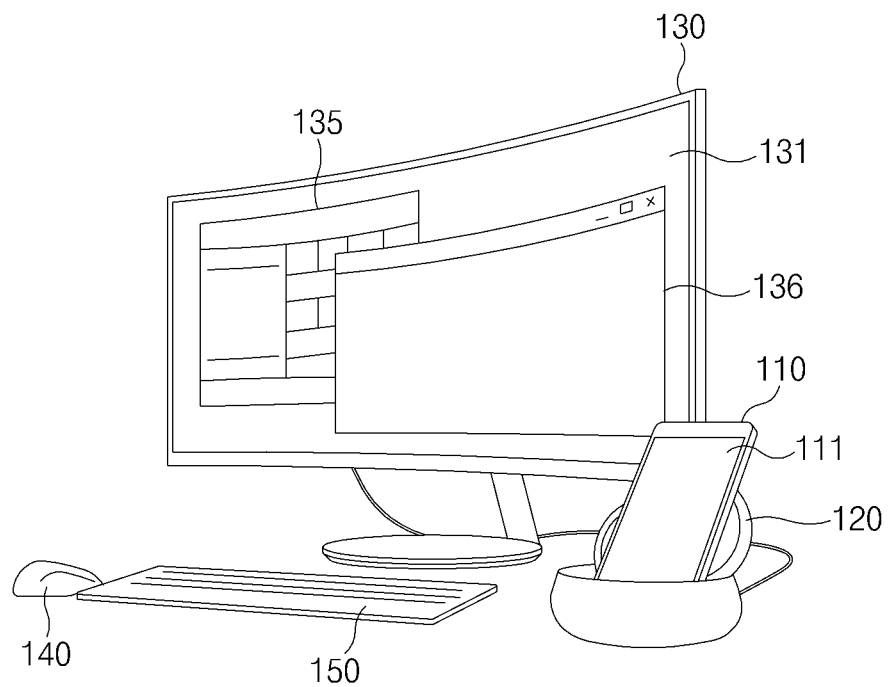
FIG. 1 is a drawing illustrating an environment where an electronic device is operated, according to various embodiments.

Hereinafter, various embodiments of the present disclosure will be described with reference to the accompanying drawings. Accordingly, those of ordinary skill in the art will recognize that modification, equivalent, and/or alternative on the various embodiments described herein can be variously made without departing from the present disclosure. With regard to description of drawings, similar components may be marked by similar reference numerals.

In the disclosure disclosed herein, the expressions "have", "may have", "include" and "comprise", or "may include" and "may comprise" used herein indicate existence of corresponding features (for example, elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms are used to distinguish an element from another element and do not limit the order and/or priority of the elements. For example, a first user device and a second user device may represent different user devices irrespective of sequence or importance. For example, without departing the scope of the present disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to the other element or an intervening element (for example, a third element) may be present. In contrast, when an element (for example, a first element) is referred to as being "directly coupled with/to" or "directly connected to" another element (for example, a second element), it should be understood that there are no intervening element (for example, a third element).

According to the situation, the expression "configured to" used herein may be used as, for example, the expression "suitable for", "having the capacity to", "designed to", "adapted to", "made to", or "capable of". The term "configured to (or set to)" does not mean only "specifically designed to" in hardware. Instead, the expression "a device configured to" may mean that the device is "capable of" operating together with another device or other components. CPU, for example, a "processor configured to (or set to) perform A, B, and C" may mean a dedicated processor (for example, an embedded processor) for performing a corresponding operation or a generic-purpose processor (for example, a central processing unit (CPU) or an application processor) which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), MP3 players, mobile medical devices, cameras, and wearable devices. According to various embodiments of the present disclosure, the wearable devices may include accessories (for example, watches, rings, bracelets, ankle bracelets, glasses, contact lenses, or head-mounted devices (HMDs)), cloth-integrated types (for example, electronic clothes), body-attached types (for example, skin pads or tattoos), or implantable types (for example, implantable circuits).

In some embodiments of the present disclosure, the electronic device may be one of home appliances. The home appliances may include, for example, at least one of a digital video disk (DVD) player, an audio, a refrigerator, an air conditioner, a cleaner, an oven, a microwave oven, a washing machine, an air cleaner, a set-top box, a home automation control panel, a security control panel, a TV box (for example, Samsung HomeSync™, Apple TV™, or Google TV™), a game console (for example, Xbox™ or PlayStation™), an electronic dictionary, an electronic key, a camcorder, or an electronic panel.

In another embodiment of the present disclosure, the electronic device may include at least one of various medical devices (for example, various portable medical measurement devices (a blood glucose meter, a heart rate measuring device, a blood pressure measuring device, and a body temperature measuring device), a magnetic resonance angiography (MRA), a magnetic resonance imaging (MRI) device, a computed tomography (CT) device, a photographing device, and an ultrasonic device), a navigation system, a global navigation satellite system (GNSS), an event data recorder (EDR), a flight data recorder (FDR), a vehicular infotainment device, electronic devices for vessels (for example, a navigation device for vessels and a gyro compass), avionics, a security device, a vehicular head unit, an industrial or home robot, an automatic teller's machine (ATM) of a financial company, a point of sales (POS) of a store, or an internet of things (for example, a bulb, various sensors, an electricity or gas meter, a spring cooler device, a fire alarm device, a thermostat, an electric pole, a toaster, a sporting apparatus, a hot water tank, a heater, and a boiler).

According to some embodiments of the present disclosure, the electronic device may include at least one of a furniture or a part of a building/structure, an electronic board, an electronic signature receiving device, a projector, or various measurement devices (for example, a water service, electricity, gas, or electric wave measuring device). In various embodiments of the present disclosure, the electronic device may be one or a combination of the aforementioned devices. The electronic device according to some embodiments of the present disclosure may be a flexible electronic device. Further, the electronic device according to an embodiment of the present disclosure is not limited to the aforementioned devices, but may include new electronic devices produced due to the development of technologies.

Hereinafter, electronic devices according to an embodiment of the present disclosure will be described with reference to the accompanying drawings. The term "user" used herein may refer to a person who uses an electronic device or may refer to a device (for example, an artificial electronic device) that uses an electronic device.

FIG. 1 is a drawing illustrating an environment where an electronic device is operated, according to various embodiments.

Referring to FIG. 1, an electronic device 110 may be connected with a mediation device 120 and an external display device 130. The electronic device 110 may be a mobile device, a display 111 of which is relatively small in size. The electronic device 110 may be a device, for example, a smartphone, a tablet PC, or a wearable device.

According to various embodiments, the display 111 of the electronic device 110 may include a touch panel (or a touch sensor). The display 111 may receive a touch input of a user. The display 111 may convert the touch input of the user into an electric signal and may transmit the converted electric signal to a processor in the electronic device 110.

According to various embodiments, the display 111 may at least in part operate as an input device (e.g., a touchpad) depending on a specified condition (e.g., whether the electronic device is connected with an external display device 130, whether the electronic device is connected with an external pointing device 140, or the like). For example, when the display 111 operates as a touchpad, a touch input of the user may be reflected in a movement or click operation of a mouse pointer or cursor output on a screen of the external display device.

According to various embodiments, the display 111 of the electronic device 110 may include a pressure sensor. The pressure sensor may detect a strength at which the user presses against the display 111. The pressure sensor may convert an input of the user into an electric signal according to a strength of the applied pressure and may transmit the converted electric signal to the processor in the electronic device 110.

According to various embodiments, the electronic device 110 may be formed including a housing having a first surface (e.g., a surface where the display 111 is exposed) and a second surface facing an opposite direction from the first surface. The housing may house additional equipment and input devices, such as a physical button, a sensor, a camera, or the like.

The mediation device 120 may connects the electronic device 110 with the external display device 130. The mediation device 120 may be, for example, a dock (e.g., a docking station). The mediation device 120 may include a holder for physically receiving the electronic device 110. In FIG. 1, an example embodiment illustrates that the electronic device 110 is disposed in the mediation device 120 in a portrait mode. However, embodiments of the invention are not limited thereto. For example, the mediation device 120 may be formed to accept insertion of the electronic device 110 in a landscape mode. The mediation device 120 may be connected with the electronic device 110 through an input/output interface, such as for example, a universal serial bus (USB) port.

The mediation device 120 may be connected with the external display device 130 through a separate cable (e.g., a high definition multimedia interface "HDMI" cable or the like). For example, the mediation device 120 may transmit an electric signal, for outputting a screen transmitted from the electronic device 110, to the external display device 130.

According to various embodiments, the mediation device 120 may include a port for receiving a wired connection with an external input device (e.g., the external pointing device 140, an external keyboard device 150, or the like). When the external input device is connected to the port, information about the connection with the external input device may be provided to the electronic device 110.

In FIG. 1, an embodiment is exemplified as the electronic device 110 is connected with the external display device 130 via the mediation device 120. However, embodiments are not limited thereto. For example, the electronic device 110 may be directly connected with the external display device 130 through a separate cable or the like or may be wirelessly connected with the external display device 130.

The external display device 130 may be a device (e.g., a monitor or a TV) which outputs content provided from the electronic device 110. The external display device 130 may output (or mirror) the same screen as the display 111 of the electronic device 110 or may at least in part output a screen different from the display 111.

The external display device 130 may be connected to the electronic device 110 via the mediation device 120. Alternatively, the external display device 130 may be directly connected with the electronic device 110 through a separate cable (e.g., a mini-HDMI cable).

According to various embodiments, the external display device 130 may include an element (e.g., a power module, an analog-digital (AD) board, a display panel, a display driver integrated circuit (DDI), or the like) for a display output and may fail to include a processor (e.g., an application processor (AP) or a central processing unit (CPU)) for a separate arithmetic operation.

According to various embodiments, when the electronic device 110 is connected with the external display device 130 (or when the electronic device 110 is in a communicable state), it may output content (e.g., an image, a text, an icon, or the like) on the external display device 130. The electronic device 110 may reconfigure at least a portion of content displayed on the display 111 and may output the reconfigured screen (hereinafter referred to as "an extended user interface") on the external display device 130. For example, the electronic device 110 may output the extended user interface which is similar to using a desktop PC on the display 131 of the external display device 130 (hereinafter referred to as "desktop mode").

The extended user interface may differ at least in part from a user interface (hereinafter referred to as "mobile user interface") output on the display 111 of the electronic device 110. For example, when a plurality of applications are being executed in the electronic device 110, a mobile user interface may output windows output by the plurality of applications in a limited manner. For example, screens of some applications may be provided, or there may be a need for a screen shift (or a task shift) to verify executing applications. On the other hand, the extended user interface may be output in a form where the plurality of applications are not overlapped with each other or in a form where some (e.g., as a window 135 and a window 136) of the plurality of applications are overlapped with each other.

The electronic device 110 may be wiredly or wirelessly connected with an external input device such as the external pointing device 140 (e.g., a mouse, a touchpad, or the like), the external keyboard device 150 (e.g., a keyboard). The electronic device 110 may receive a user input through the external pointing device 140 or the external keyboard device 150. The user may control content output on the electronic device 110 or the external display device 130 using the external pointing device 140 or the external keyboard device 150.

According to various embodiments, when the electronic device 110 is connected with the external display device 130, a user input occurred using the external pointing device 140 or the external keyboard device 150 may be reflected in the extended user interface. For example, in response to an input of the user, a mouse pointer or cursor of the extended user interface may be moved or a text may be output.

According to various embodiments, in a state where the electronic device 110 outputs the extended user interface on the external display device 130, when the electronic device 110 does not recognize the external pointing device 140 (e.g., when there is the external pointing device 140, when the external pointing device 140 is out of a communication distance, when the external pointing device 140 is powered off, or the like), it may operate at least a portion of the display 111 as an input device (e.g., a touchpad). For example, when a touch input of the user or an input through pressure occurs on the display 111, a mouse pointer or cursor displayed on the external display device 130 may be moved or an operation, such as a single click, a double click, or the like, may be performed.

Figure 2:
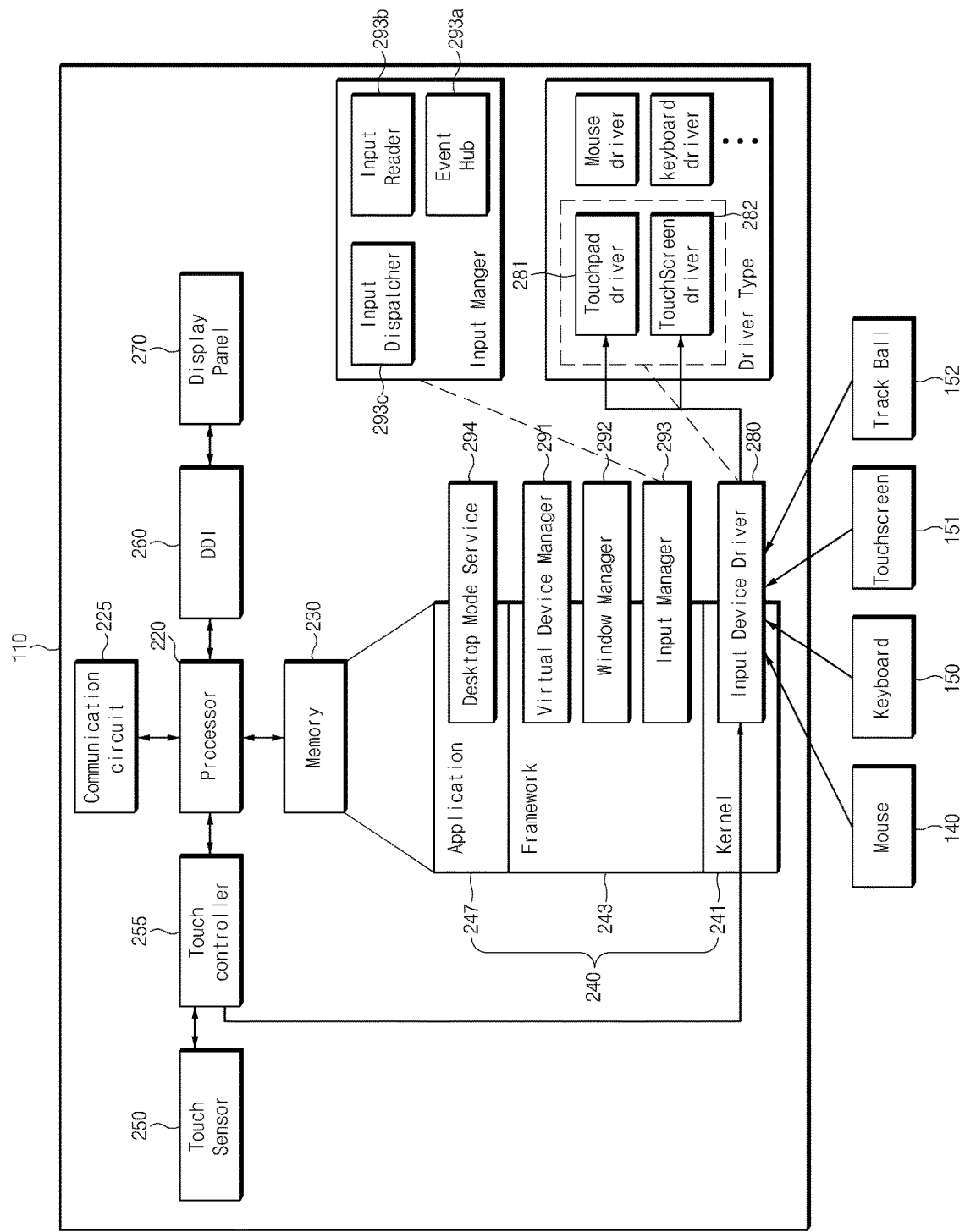
FIG. 2 is a block diagram illustrating a configuration of an electronic device according to various embodiments.

FIG. 2 is a block diagram illustrating a configuration of an electronic device according to various embodiments.

Referring to FIG. 2, an electronic device 110 may include a processor 220, a communication circuit 225, a memory 230, a touch sensor 250, a touch controller 255, a display driver integrated circuit (DDI) 260, and a display panel 270. In some embodiments, the electronic device 110 may fail to include at least one of the elements or may further include other element(s).

The processor 220 may include one or more of a central processing unit (CPU), an application processor (AP), or a communication processor (CP). For example, the processor 220 may perform, for example, an arithmetic operation or data processing associated with control and/or communication of at least one other element(s) of the electronic device 110. In various embodiments, the processor 220 may operate at least a portion of the display panel 270 as a touchpad depending on a specified condition (e.g., whether the electronic device 110 is connected with an external display device 130 of FIG. 1 or whether the electronic device 110 is connected with an external pointing device 140 of FIG. 1).

The communication circuit 225 may communicate between the electronic device 110 and an external device (e.g., a mediation device 120 of FIG. 1, the external pointing device 140, an external keyboard device 150 of FIG. 1, or the like). The communication circuit 225 may support at least one of, for example, wireless-fidelity (Wi-Fi), Bluetooth, Bluetooth low power (BLE), Wi-Fi direct, Zigbee, near field communication (NFC), magnetic secure transmission, a radio frequency (RF), or a body area network (BAN).

The memory 230 may include a volatile and/or nonvolatile memory. For example, the memory 230 may store, for example, instructions or data associated with at least one other element(s) of the electronic device 110. According to an embodiment, the memory 230 may store software and/or a program 240.

The program 240 may include, for example, a kernel 241, a framework 243, and/or an application program (or an "application") 247. At least a part of the kernel 241 or the framework 243 may be referred to as an "operating system (OS)".

For example, the kernel 241 may control or manage, for example, system resources which are used to execute operations or functions of other programs (e.g., the framework 243 or the application program 247). Furthermore, the kernel 241 may provide an interface which allows the framework 243 or the application program 247 to access discrete elements of the electronic device 110 to control or manage system resources.

According to various embodiments, the kernel 241 may include the input device driver 280. The input device driver 280 may interface with various input devices (e.g., the external pointing device 140, the external keyboard device 150, an external touch screen 151, an external trackball 152, or the like) capable of being connected to the electronic device 110. The input device driver 280 may manage input devices depending on a type. The input device driver 280 may include a driver corresponding to each input device.

According to various embodiments, the input device driver 280 may include a touchpad driver 281 and a touchscreen driver 282, which process a touch input occurred on the touch sensor 250.

The touchpad driver 281 may provide an interface when the touch sensor 250 operates as a touchpad. The touchpad driver 281 may process an electric signal corresponding to a touch input of a user, transmitted from the touch controller 255, to be applied in an extended user interface to be output on the external display device 130.

The touchscreen driver 282 may provide an interface when the touch sensor 250 operates as a touchscreen. The touchscreen driver 282 may process an electric signal for a touch input of the user, transmitted from the touch controller 255, to be applied in a mobile user interface of the electronic device 110.

According to various embodiments, according to a connection scheme with the external display device 130, whether the electronic device 110 is connected with the external pointing device 140, an output direction of the electronic device 110 (e.g., a landscape mode or a portrait mode), or the like, the touchpad driver 281 and the touchscreen driver 282 may be simultaneously executed or one of the touchpad driver 281 or the touchscreen driver 282 may be executed. Additional information about a scheme where the touchpad driver 281 and the touchscreen driver 282 are executed may be provided through a separate drawing.

The framework 243 may perform, for example, a mediation role such that the application program 247 communicates with the kernel 241 to exchange data. Furthermore, the framework 243 may process one or more task requests received from the application program 247 in order of priority. For example, the framework 243 may assign the priority, which makes it possible to use a system resource of the electronic device 110, to at least one of the application program 247 and may process the one or more task requests.

According to various embodiments, the framework 243 may include a virtual device manager 291, a window manager 292, and an input manager 293.

The virtual device manager 291 may request the window manager 292 to generate an extended user interface based on connection information with the external display device 130 or a mediation device 120 of FIG. 1, provided from a desktop mode service 294.

When activity of an application is generated, the window manager 292 may register a window of the activity. The window manager 292 may transmit an event to the registered window of the application. The window manager 292 may transmit the event to current activity again and may process the event by a process of transmitting the event to a view again. For example, the window manager 292 may display an icon of providing a function, such as "back", "minimize", "maximize", or "close", on an upper header of a window output on the extended user interface.

The input manager 293 may include an event hub 293a, an input reader 293b, and an input dispatcher 293c. The event hub 293a may be responsible for a task such as "device open, close, or read". The event hub 293a may scan devices of a device driver and may open such devices to manage handles (read an event), thus stacking the event in an event queue. The input reader 293b may call corresponding methods. The input dispatcher 293c may unstack an event from the event queue and may call a dispatch method of the window manager 292.

The application program (or the "application") 247 may include the desktop mode service 294. The desktop mode service 294 may output a user interface for executing a desktop mode. The desktop mode service 294 may collect information about a connection with the external display device 130 or the mediation device 120 and may transmit the collected connection information to the virtual device manager 291.

The touch sensor 250 may sense a touch input of the user. The touch sensor 250 may be changed in a specified physical quantity (e.g., voltage, an amount of light, resistance, an amount of electric charge, capacitance, or the like) by a touch from the user. In an embodiment, the touch sensor 250 may be included in the display panel 270 or may be integrated with the display panel 270.

The touch controller 255 may be electrically connected with the touch sensor 250 and may detect a change in physical quantity in the touch sensor 250. The touch controller 255 may include at least a portion of a driver circuit, a sensor circuit, a control logic, an oscillator, a delay table, an analog-digital converter, or a microcontroller unit (MCU). The touch controller 255 may produce data about a touch (e.g., coordinate data (X, Y) of a location where the touch is performed) based on a change in physical quantity (e.g., voltage, resistance, capacitance, or the like) in the touch sensor 250.

According to various embodiments, the touch controller 255 may provide data according to a touch input of the user or an input through pressure (e.g., coordinate data (X, Y) of a location where a touch is performed, data about strength of pressure, or the like) to the kernel 241.

The DDI 260 may be electrically connected with the display panel 270 and may provide an image signal corresponding to image data received from the processor 220 to the display panel 270. Additional information about an operation of the DDI 260 may be provided with reference to FIG. 11.

The display panel 270 may output content (e.g., a text, an image, a video, an icon, a symbol, and/or the like) based on an image signal provided from the DDI 260. The display panel 270 may include, for example, a liquid crystal display (LCD), a light-emitting diode (LED) display, an organic LED (OLED) display, a microelectromechanical systems (MEMS) display, or an electronic paper display.

According to various embodiments, the display panel 270 may have a form including the touch sensor 250 and may receive a touch, a gesture, proximity, or a hovering input which uses a part of a user's body or an electronic pen. When the display panel 270 includes the touch sensor 250, the display panel 270 may be used at least in part as a touch pad according to a specified condition.

FIG. 3A is a drawing illustrating a configuration of a mediation device according to various embodiments. The mediation device according to various embodiments may include all or at least some of the elements of a mediation device 120 of FIG. 1.

The mediation device 120 may hold or support an electronic device (e.g., an electronic device 110 of FIG. 1 or 2) in a housing 301 thereof, and may connect the held electronic device with another additional device (e.g., an external display device 130 of FIG. 1) or a network. For example, the mediation device 120 may supply power to the held electronic device using an included a power connector, and may further be connected with a video appliance, such as a monitor or a TV, by using an included an HDMI connector, may further still be connected with a wired network using an included local area network (LAN) connector, or may provide a connection with various input/output devices or storage devices by including a universal serial bus (USB) connector.

The housing 301 may include a male connector, such for example, a first connection member, for a connection with an external electronic device and a plurality of female connectors, for example, a plurality of second connection members, for a connection of another additional device, an input/output device, or the like. The first connection member may be connected with each of the plurality of second connection members through a printed circuit board (PCB).

According to various embodiments, the housing 301 may include a first surface F1, a second surface F2 which faces an opposite direction from the first surface F1, and a side surface which surrounds, at least in part, a space between the first surface F1 and the second surface F2. In a detailed embodiment of the present disclosure, an example embodiment is shown in which the housing 301 is generally provided in the shape of a cylinder or a circular, truncated cone. However, embodiments of the present disclosure are not limited thereto. For example, the first surface F1 or the second surface F2 of the housing 301 may be formed having a polygonal shape. An embodiment is exemplified as the side surface F3 has a convex shape. However, embodiments are not limited thereto. For example, the side surface F3 may has a planar or concave shape.

According to various embodiments, one or more connection holes 315*a*, 315*b*, 315*c* and 315*d* may be provided in an external surface of the housing 301, for example, the side surface F3. The at least one connection hole 315*a* to 315*d* may be provided as, for example, a power connector, an HDMI connector, a LAN connector, a USB connector, and the like. The second connection members respectively corresponding to the at least one connection hole 315*a* to 315*d* may be located in the housing 301.

In an embodiment, a holding groove 311*a* may be formed for providing, for example, a space where an electronic device (e.g., an electronic device 110 of FIG. 1) may be detached, and may include a size and shape capable of receiving a portion of the electronic device. For example, the electronic device may be affixed or secured in the housing 301 by being mounted on the holding groove 311*a*. In some embodiments, a male connector, for example, a connection member 317*e*, connected with the electronic device, may be provided in the holding groove 311*a*. The connection member 317*e* may be, for example, a connector complying with the USB Type C standard, and may be connected with other connection member(s) through a PCB embedded in the housing 301. For example, the housing 301 may connect the electronic device held in the holding groove 311*a* with an external power supply or a network (e.g., a wired network such as a LAN) or with an input/output device, such as a keyboard or a mouse, an external storage device, or the like.

According to various embodiments, the mediation device 120 may further include a slide housing 302. The slide housing 302 may be slidably mounted and may open and close the holding groove 311*a*. The connection member 317*e* located in the holding groove 311*a* may be opened by the slide housing 302. For example, the electronic device may be held in the housing 301 (e.g., the holding groove 311*a*) in a state where the slide housing 302 is slanted. In another embodiment, the slide housing 302 may be disposed to support one surface of the electronic device held in the housing.

According to various embodiments, the slide housing 302 may include a curved case 302*a* and a flat case 302*b*. The flat case 302*b* may be combined with the curved case 302*a*, and may be positioned on the first surface F1 along slidable movement of the slide housing 302 or may be inclined toward the first surface (or the second surface F2). According to an embodiment, a direction where the connection member 317*e* disposed in the holding groove 311*a* is arranged may be substantially perpendicular to a direction the flat case 302*b* (e.g., an external side) faces in the opened position.

According to various embodiments, the slide housing 302 may be loaded with various electrical components. For example, the slide housing 302 may be loaded with a cooling fan, a loop antenna, and the like. In an embodiment, the cooling fan may suppress and reduce heating of the held electronic device and may establish communication between the mediation device 120 and the held electronic device. In some embodiments, the loop antenna may be used for wireless power transmission. When the held electronic device has a wireless charging function, it may receive a charging power or the like through the loop antenna. According to an embodiment, the wireless charging function may be provided in a state where the slide housing 302 closes the holding groove 311*a*. For example, when the electronic device having the wireless charging function is put on the first surface F1 or the slide housing 302 in the closed position, the loop antenna may wirelessly transmit power. In another embodiment, the slide housing 302 may be loaded with a speaker (not shown) and may receive a sound signal from the electronic device through the connection member 317*e* provided in the holding groove 311*a*, the loop antenna, or the like. For example, the speaker may receive a sound signal from the electronic device in a wired manner through the connection member 317*e* provided in the holding groove 311*a* or in a Bluetooth mode through the loop antenna. In some embodiments, when a cooling fan, a speaker, or the like is loaded into the slide housing 302, vent holes 329 for flow of air or an output of a sound may be provided. For example, a plurality of through-holes may be formed in the curved case 302*a* and/or the flat case 302*b* to smoothly allow air to flow or smoothly output a sound.

According to various embodiments, an electrical component(s) loaded into the slide housing 302 may be electrically connected with a PCB embedded in the housing 301.

Figure 3B:
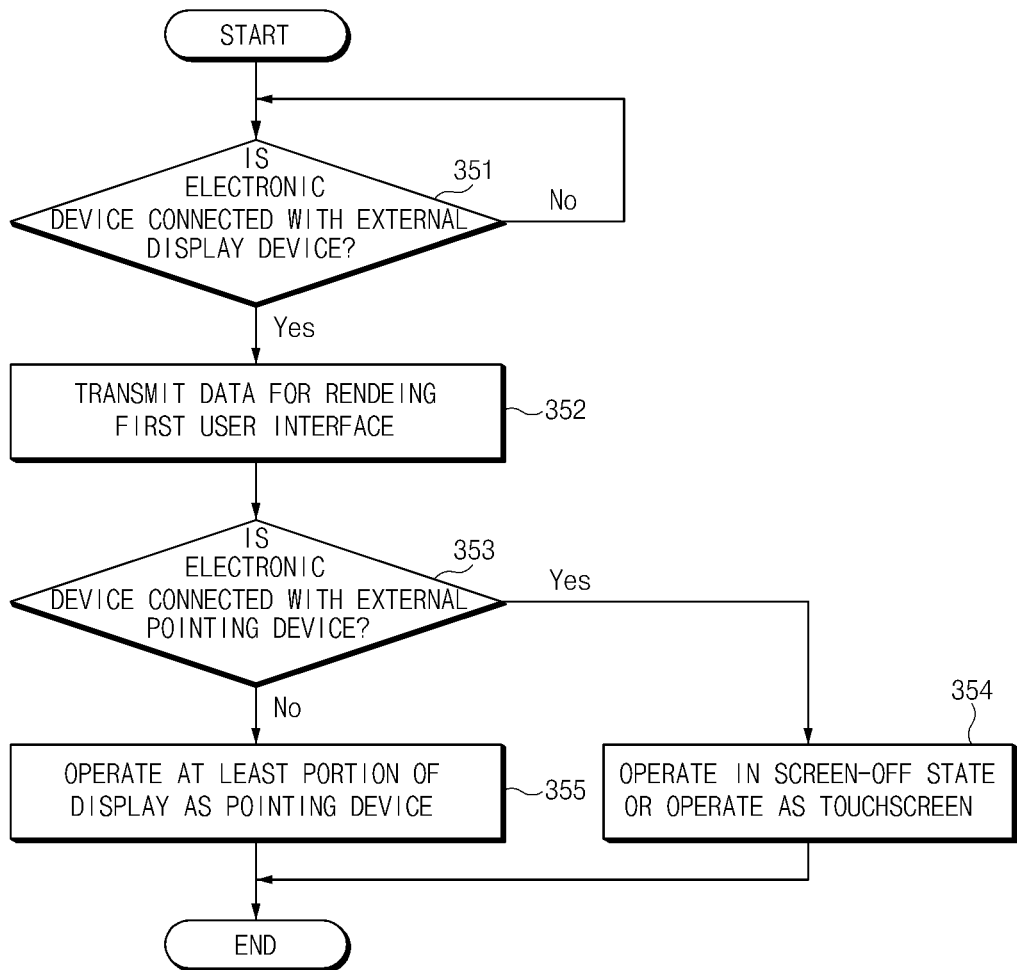
FIG. 3B is a flowchart illustrating a screen output method according to various embodiments.

FIG. 3B is a flowchart illustrating a screen output method according to various embodiments.

The electronic device according to various embodiments may include all or at least some of elements of an electronic device 110 of FIG. 2.

Referring to FIG. 3B, in operation 351, a processor 220 of FIG. 2 may detect whether the electronic device 110 is connected with an external display device 130 via a communication circuit (e.g., communication circuit 225 of FIG. 2, using wired or wireless communication). When wired communication is utilized, the electronic device 110 may be connected to the external display device 130 via a mediation device (such as 120 of FIG. 2) or may be directly connected to the external display device 130 through a cable without a separate intermediate device.

In operation 352, when the electronic device 110 is connected with the external display device 130, the processor 220 may transmit data for rendering an extended user interface on a display 131 of the external display device 130 to the external display device 130 via the communication circuit 225.

According to an embodiment, the extended user interface may have a form of reconfiguring a mobile user interface output on a display 111 of the electronic device 110. Thus, the mobile user interface output on the electronic device 110 may differ at least in part from the extended user interface output on the external display device 130.

For example, when a plurality of applications are being executed in the electronic device 110, the mobile user interface may display some of windows output by the plurality of applications. There may be a need of a screen (or task) shift to verify a window which is not displayed. On the other hand, the extended user interface may be output in a form where the plurality of applications are not overlapped with each other or where some of the plurality of applications are overlapped with each other. The extended user interface may provide a user environment similar to an environment where a user uses a typical desktop PC or a typical laptop PC.

According to various embodiments, the processor 220 may receive information (e.g., device identification information, resolution information, size information, screen ratio information, or the like) about an image output from the external display device 130 via the communication circuit 225. The processor 220 may configure the extended user interface based on the received information.

In operation 353, the processor 220 may detect whether an external pointing device 140 (e.g., a mouse) is connected to the electronic device 110 via the communication circuit 225. The external pointing device 140 may be connected to the electronic device 110 in a wireless or wired manner. For example, in case of a wireless connection, the external pointing device 140 may be connected to the electronic device 110 through short range communication such as Bluetooth. In yet another example, in a case of a wired connection, the external pointing device 140 may be connected to a port mounted on the mediation device 120 through an attached cable. In this case, when the electronic device 110 is held in the mediation device 120, the processor 220 may recognize the external pointing device 140 connected to the mediation device 120.

In operation 354, when the external pointing device 140 is connected to the electronic device 110, the processor 220 may operate a touch sensor 250 (or a display panel 270) of FIG. 2 in a screen-off state or as a touchscreen.

When the touch sensor 250 is in the screen-off state, a touch controller 255 of FIG. 2 does not transmit touch signals detected by the touch sensor 250 to the processor 220. Thus, an amount of power consumed by the electronic device 110 may be reduced.

When the touch sensor 250 operates as the touchscreen and when a touch of a user occurs on the touch sensor 250, the touch controller 255 may transmit a corresponding electric signal to a kernel 241 of FIG. 2. A touchscreen driver 282 of the kernel 241 may process a received touch related signal.

In operation 355, when the external pointing device 140 is not connected to the communication circuit 225 of the electronic device 110 (e.g., when there is no external pointing device 140, when the external pointing device 140 is out of a communication distance, when the external pointing device 140 is powered off, or the like), the processor 220 may allow at least a portion of the display 111 to operate as a pointing device (e.g., as a touchpad). Hereinafter, an embodiment is exemplified as the at least portion of the display 111 operates as the touchpad. However, embodiments are not limited thereto.

When a touch of the user occurs on the touch sensor 250 in a state where the external pointing device 140 is not connected to the electronic device 110, the touch controller 255 may transmit a corresponding electric signal to the kernel 241. The touchpad driver 281 of the kernel 241 may process a corresponding touch signal.

The touchpad driver 281 may convert an electric signal according to a touch input into a relative coordinate value or the like and may transmit the converted relative coordinate value or the like to a window manager 292 of FIG. 2. The window manager 292 may reflect information about a change in touch input in an extended user interface. For example, when the user swipes the display 111 in an up/down/left/right direction, a mouse pointer or cursor output on the external display device 130 may be moved in the up/down/left/right direction.

According to an embodiment, the processor 220 may allow the entire region of the display 111 to operate as a touchpad or may allow a portion of the entire region of the display 111 to operate as a touchpad.

When the portion of the entire region of the display 111 operates as the touchpad, the processor 220 may control the display 111 to display an indication (hereinafter referred to as "first user interface") for distinguishing the operation which operates as the touchpad in the display 111 from the other region. For example, the processor 220 may control the display 111 to display the region which operates as the touchpad using a box or a corner.

According to an embodiment, a black screen or another separate user interface (e.g., a guide image for iris recognition) may be output on the other region except for the region (hereinafter referred to as "pad region") which operates as the touchpad.

According to various embodiments, when the processor 220 recognizes the external pointing device 140 while at least a portion of the display 111 operates as a touchpad, it may end the touchpad operation of the display 111.

Figure 4:
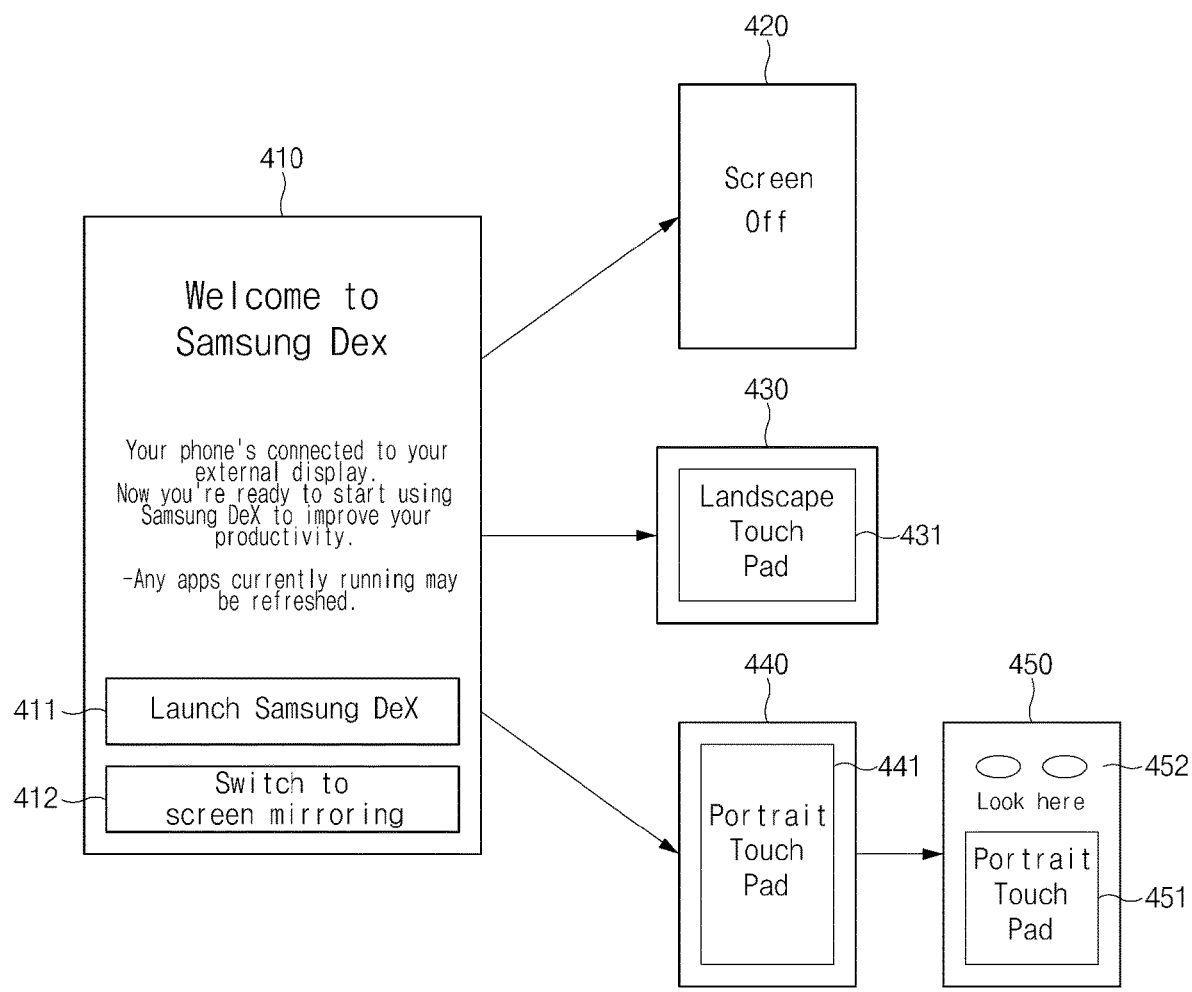
FIG. 4 is a drawing illustrating a screen output of an electronic device according to various embodiments.

FIG. 4 is a drawing illustrating a screen output of an electronic device according to various embodiments.

The electronic device according to various embodiments may include all or at least some of elements of an electronic device 110 of FIG. 2.

Referring to FIG. 4, when an external electronic device (e.g., an external display device 130 of FIG. 1) is connected to an electronic device 110 of FIG. 1 (or when the external display device 130 is detected), a processor 220 of FIG. 2 may control a display 111 of FIG. 1 to output a mode selection screen 410 for receiving an operation mode of the electronic device 110.

According to an embodiment, the mode selection screen 410 may include a desktop mode launch button 411 and a screen mirroring button 412. When the user selects the desktop mode launch button 411, the processor 220 may verify whether an external pointing device 140 of FIG. 1 is connected to the electronic device 110.

When the user selects the screen mirroring button 412, the processor 220 may control the external display device 130 to output the same screen as displayed on a mobile user interface.

According to an embodiment, when the user selects the desktop mode launch button 411, a screen-off screen 420 or touchpad screens 430, 440, and 450 may be output according to a specified condition.

According to an embodiment, when the external pointing device 140 is wiredly or wirelessly connected to the electronic device 110, the processor 220 may control the display 111 to output the screen-off screen 420. In an embodiment, when the user generates a separate input such as a button input of the electronic device 110, the processor 220 may control the display 111 to output a mobile user interface.

According to an embodiment, when the external pointing device 140 is not wiredly or wirelessly connected to the electronic device 110 and when a specified condition is met (e.g., when the electronic device 110 is connected to the external display device 130 through a separate cable without a mediation device 120 of FIG. 1, when the electronic device 110 is held in the mediation device 120 in a landscape direction, when the electronic device 110 detects a landscape direction through its sensor, or the like), the processor 220 may control the display 111 to output the touchpad screen 430 of a landscape mode.

The entire or partial region of the display 111 may be a region which validly operates as a touchpad. The processor 220 may distinguish a pad region 431 from a region (e.g., a touch non-recognition region) around the pad region 431 through box indication or the like.

According to an embodiment, the external pointing device 140 may fail to be wiredly or wirelessly connected to the electronic device 110 and the electronic device 110 may be connected to the external display device 130 through the mediation device 120. In this case, the processor 220 may control the display 111 to output the touchpad screen 440 of a portrait mode. The entire or partial region of the display 111 may be a region which validly operates as a touchpad. The processor 220 may distinguish a pad region 441 from a region (e.g., a touch non-recognition region) around the pad region 441 through a box indication or the like.

According to various embodiments, when at least a portion of the display 111 operates as a touchpad, the processor 220 may convert and process a touch input with respect to the landscape mode. A touch input in the portrait mode may be processed by matching coordinates of the touch input to correspond to the landscape mode.

When a specified function (or a specified application) is executed while at least a portion of the display 111 operates as a touchpad, the processor 220 may control the display 111 to output a screen 450 including a user interface (hereinafter referred to as "second user interface") utilized for executing the function on a region around a pad region.

For example, in a state where the display 111 operates as a touchpad in the portrait mode, when an application for iris recognition is executed, the pad region 441 of the portrait mode may be a reduced pad region 451. A user interface 452 for providing a guide to the user for iris recognition may be output on a region around the pad region 451.

Figure 5:
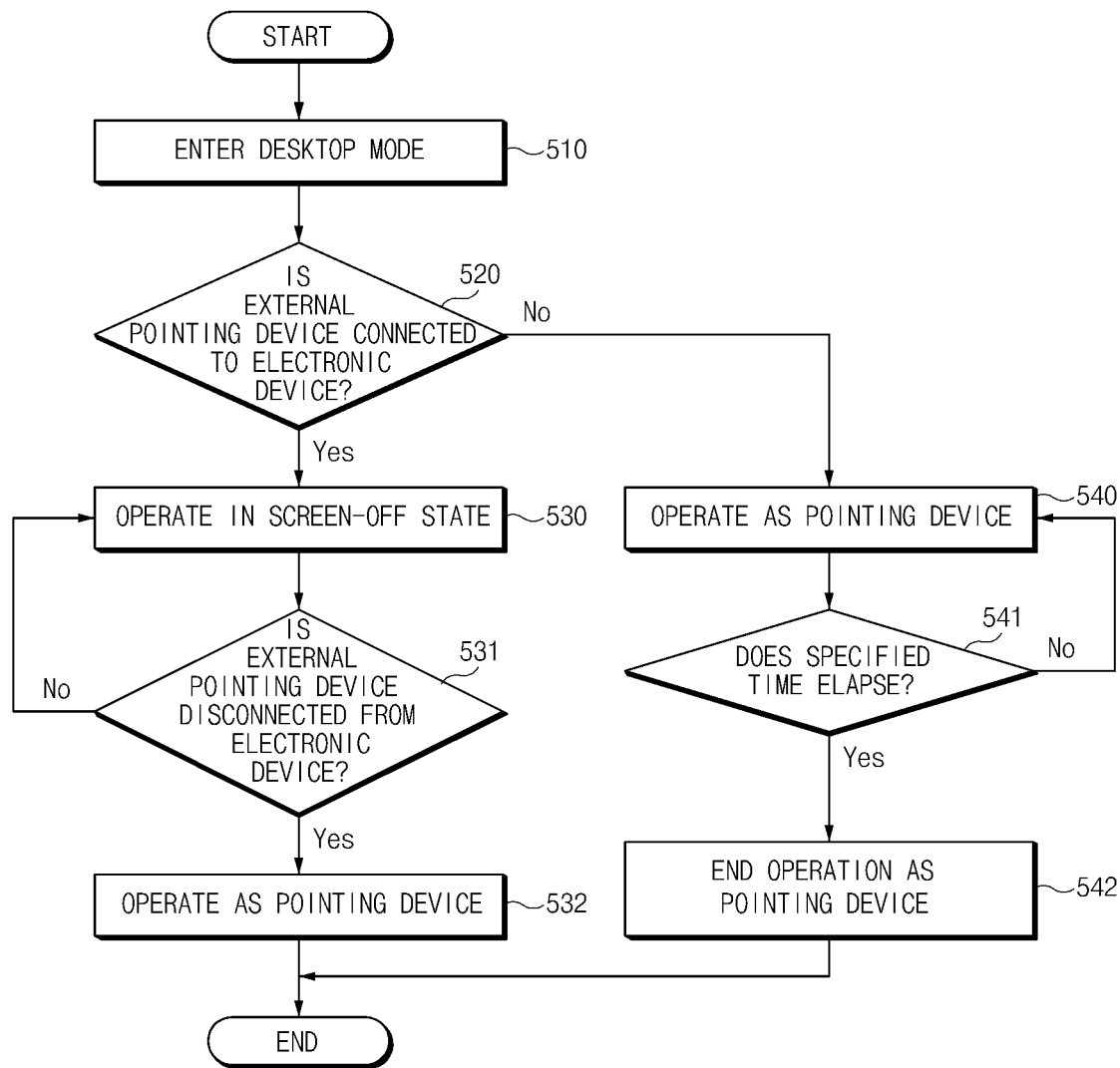
FIG. 5 is a flowchart illustrating turning on/off a touch pad operation while a display operates as a touch pad, according to various embodiments.

FIG. 5 is a flowchart illustrating turning on/off a touch pad operation while a display operates as a touch pad, according to various embodiments.

An electronic device according to various embodiments may include all or at least some of elements of an electronic device 110 of FIG. 2.

Referring to FIG. 5, in operation 510, the electronic device 110 may operate itself as an input device and may enter a mode (hereinafter referred to as "desktop mode") for outputting content on an external display device 130 of FIG. 1. For example, when detecting a connection (or communication) with the external display device 130, a processor 220 of FIG. 2 may output a user interface (e.g., a pop-up) for entering the desktop mode. When receiving a selection for the desktop mode from a user, the processor 220 may enter the desktop mode. For another example, the processor 220 may automatically enter the desktop mode depending on a specified condition (e.g., when a predetermined time such as 10 seconds elapses after the connection).

In operation 520, when the electronic device 110 enters the desktop mode, the processor 220 may verify whether an external pointing device 140 is connected to the electronic device 110.

In operation 530, when the external pointing device 140 is connected to the electronic device 110, the processor 220 may allow a display 111 of FIG. 1 to operate in a screen-off state or as a touchscreen. A user may control a mouse pointer or cursor output on the external display device 130 through the external pointing device 140.

In operation 531, after the external pointing device 140 is connected to the electronic device 110, the processor 220 may continuously or periodically detect whether the connection is released (e.g., whether a mouse is physically removed, whether Bluetooth "BT" communication is turned off, whether the mouse is out of a BT communicable distance, or the like).

According to various embodiments, after the external pointing device 140 is connected to the electronic device 110, when the external pointing device 140 temporarily enter a sleep state (e.g., when the external pointing device 140 enters the sleep state because it is not used during a predetermined period of time), the processor 220 may fail to operate the display 111 as a touchpad. Thus, an inconvenience capable of being generated to the user due to a frequent change to a touchpad may be reduced.

In operation 532, when the connection with the external pointing device 140 is released, the processor 220 may operate the display 111 as a pointing device (e.g., a touchpad).

In operation 540, when the external pointing device 140 is not connected to the electronic device 110, the processor 220 may allow at least a portion of the display 111 to operate as a pointing device (e.g., a touchpad).

While the at least portion of the display 111 operates as the pointing device, in operation 541, the processor 220 may verify whether a specified time (e.g., 10 seconds) elapses after a separate user input does not occur on the display 111.

In operation 542, when the specified time elapses, the processor 220 may end the operation as the pointing device (e.g., the touchpad) of the display 111. When it is determined as a state where the user does not use a touchpad, the processor 220 may end the operation as the touchpad of the display 111 to reduce power usage. In various embodiments, when a separate user input (e.g., a physical button input or an input through a sensor) occurs, the processor 220 may operate the display 111 as a touchpad again.

Figure 6:
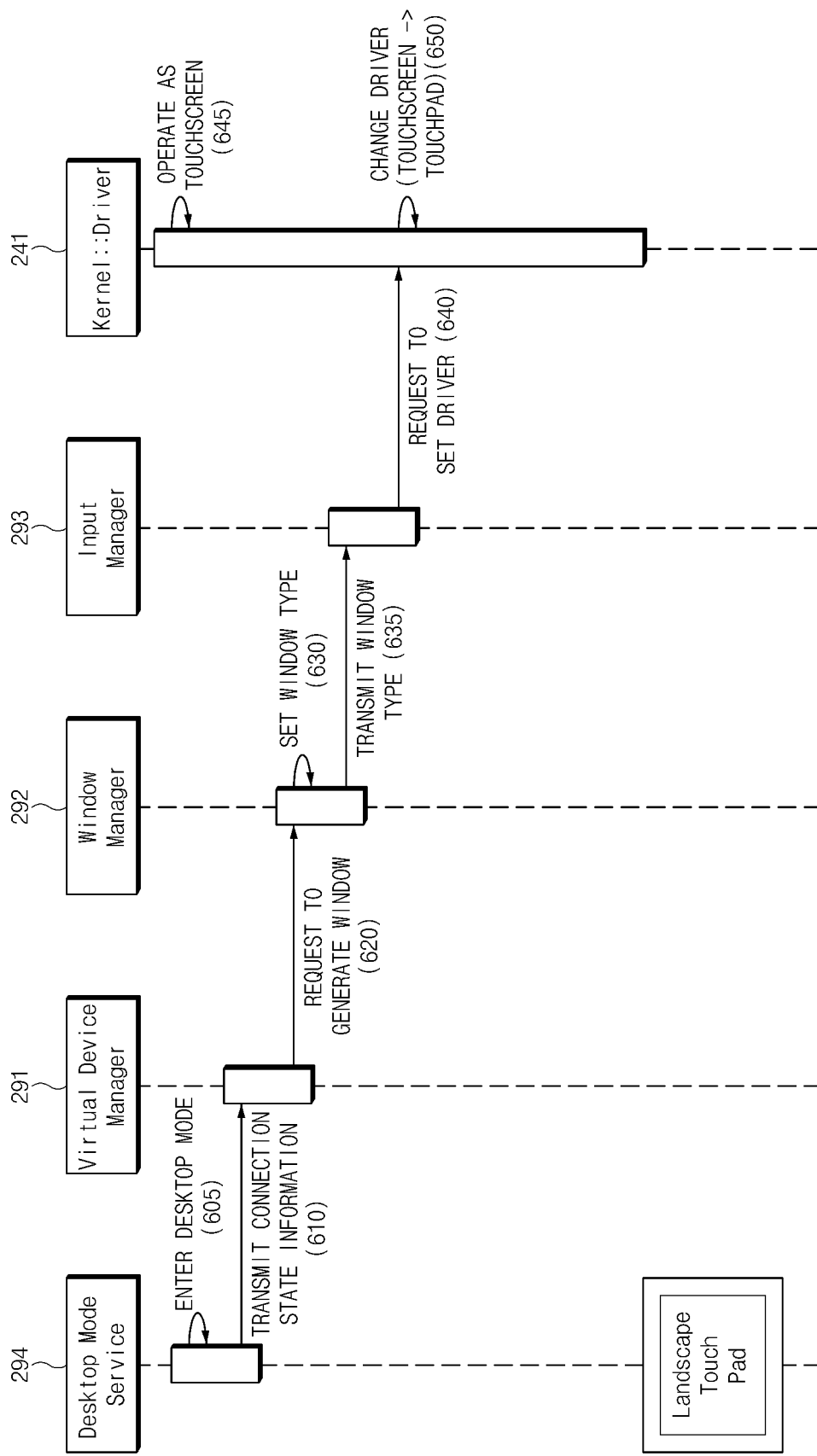
FIG. 6 is a signal sequence diagram illustrating setting of a touchpad in a landscape mode according to various embodiments.

FIG. 6 is a signal sequence diagram illustrating setting of a touchpad in a landscape mode according to various embodiments.

Referring to FIG. 6, in operation 605, a desktop mode service 294 may enter a desktop mode. The desktop mode service 294 may collect information about a connection mode with an external display device 130 of FIG. 1 (e.g., information about whether an electronic device 110 is connected to the external display device 130 via a mediation device 120 of FIG. 1, information about whether the electronic device 110 is directly connected to the external display device 130 through a separate cable, or the like) (hereinafter referred to as "connection state information"). In an embodiment, the connection state information may include information about whether a display 111 of FIG. 1 is in a landscape mode or a portrait mode.

According to various embodiments, the desktop mode service 294 may verify whether an external pointing device 140 of FIG. 1 is connected to the electronic device 110 to determine whether to operate at least a portion of the display 111 as a touchpad. For example, when the external pointing device 140 is not connected to the electronic device 110, the desktop mode service 294 may start a process (operations 610 to 650) of setting a touch input of a user to be processed by a touchpad driver 281 of FIG. 2.

When entering the desktop mode, in operation 610, the desktop mode service 294 may provide the connection state information or information about an output direction of the electronic device 110 to a virtual device manager 291 of a framework 243 of FIG. 2. For example, when the electronic device 110 is connected to the external display device 130 through a separate cable without the mediation device 120, when the electronic device 110 is held in the mediation device 120 in a landscape direction, or when the electronic device 110 detects the landscape direction through its sensor, the desktop mode service 294 may inform the virtual device manager 291 that the display 111 is in the landscape mode.

In operation 620, the virtual device manager 291 may request a window manager 292 to generate a window for configuring an extended user interface based on the connection state information.

In operation 630, the window manager 292 may set a window type to a touchpad type between a touchscreen type and the touchpad type.

In operation 635, the window manager 292 may transmit information about the window type to an input manager 293.

In operation 640, the input manager 293 may request the kernel 241 to set a driver corresponding to a touch sensor 250 of FIG. 2 to the touchpad driver 281.

In operation 645, the kernel 241 may be in a state where it operates as a touchscreen. A signal received from the touch sensor 250 may be processed by a touchscreen driver 282 of FIG. 2. For example, after the electronic device 110 enters the desktop mode and before a driver corresponding to the touch sensor 250 is changed to the touchpad driver 281, the kernel 241 (or the driver corresponding to the touch sensor 250) may be in a state where it operates as a touchscreen.

In operation 650, the kernel 241 may set the driver corresponding to the touch sensor 250 to the touchpad driver 281. When the user touches the touch sensor 250, the kernel 241 may receive information about a location where a touch input occurs or information about a change in touch input as relative coordinate movement information through the touchpad driver 281.

The touchpad driver 281 may convert a touch signal received from the touch sensor 250 into a relative coordinate value or the like and may provide the converted relative coordinate value or the like to the window manager 292. The window manager 292 may reflect information about the operation as the touchpad in the extended user interface.

Figure 7:
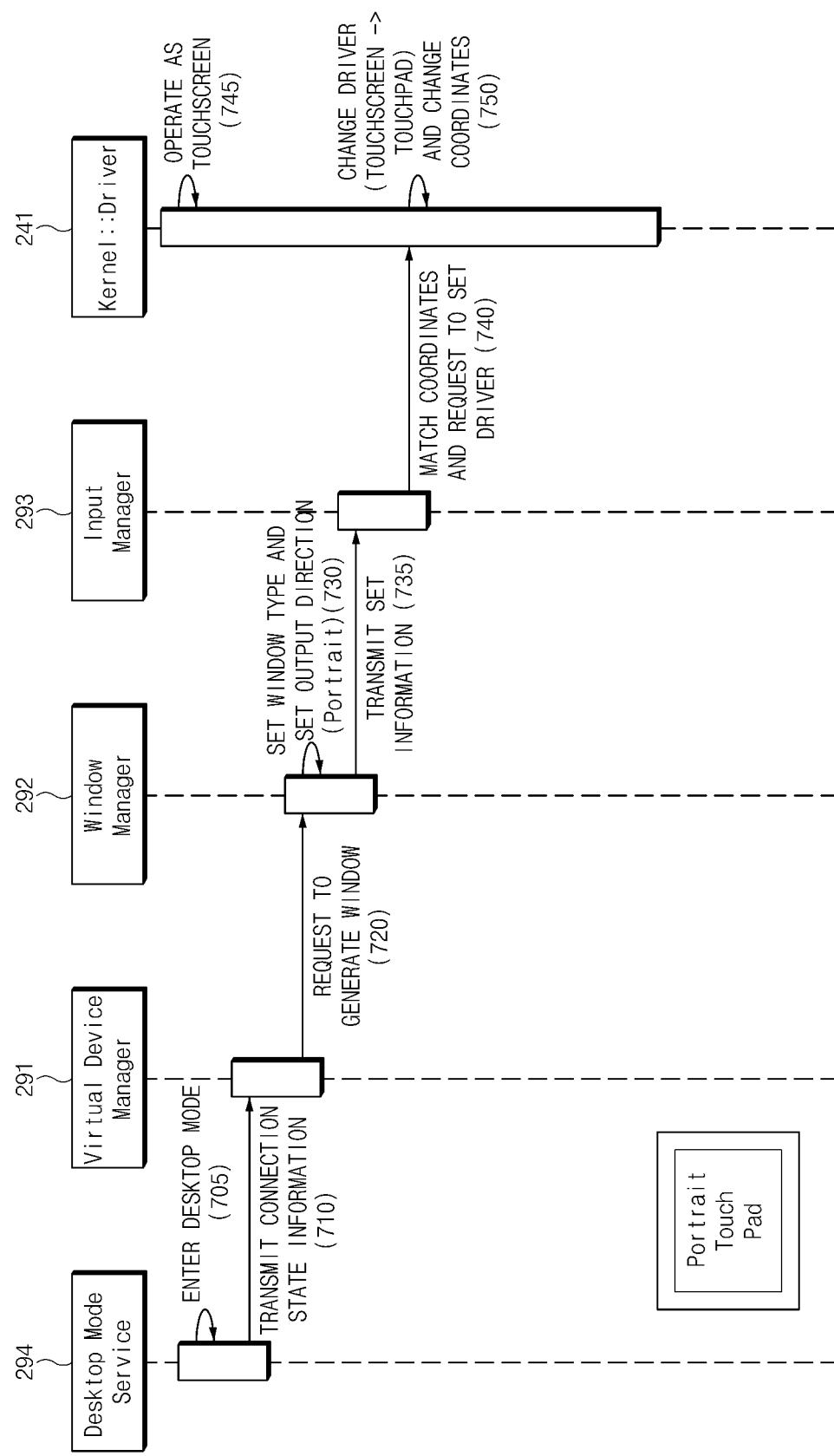
FIG. 7 is a signal sequence diagram illustrating setting of a touchpad in a portrait mode according to various embodiments.

FIG. 7 is a signal sequence diagram illustrating setting of a touchpad in a portrait mode according to various embodiments.

Referring to FIG. 7, operation 705 may be the same or similar to operation 605 in FIG. 6.

When entering a desktop mode, in operation 710, a desktop mode service 294 may provide connection state information to a virtual device manager 291 of a framework 243 of FIG. 2. For example, the desktop mode service 294 may inform the virtual device manager 291 that an electronic device 110 of FIG. 1 is connected to an external display device 130 of FIG. 1 via a mediation device 120 of FIG. 1 and is in a portrait mode.

In operation 720, the virtual device manager 291 may request a window manager 292 to generate a window for configuring an extended user interface based on the connection state information.

In operations 730 and 735, the window manager 292 may set a window type to a touchpad type between a touchscreen type and the touchpad type. The window manager 292 may transmit information about the window type to an input manager 293. Further, the window manager 292 may inform the input manager 293 that an output direction of the display 111 is in a portrait mode different from a landscape mode set to a default.

In operation 740, the input manager 293 may convert a coordinate value of the portrait mode into a rotation or relative coordinate value to be matched to a coordinate value of the landscape mode. The input manager 293 may request a kernel 241 of FIG. 2 to set a driver corresponding to a touch sensor 250 of FIG. 2 to a touchpad driver 281 of FIG. 2, based on the matched coordinate value.

In operation 745, the kernel 241 may be in a state where it operates as a touchscreen. A signal received from the touch sensor 250 may be processed by a touchscreen driver 282 of FIG. 2.

In operation 750, the kernel 241 may set the driver corresponding to the touch sensor 250 to the touchpad driver 281. When a user touches the touch sensor 250, the kernel 241 may receive information about a location where a touch input occurs or information about a change in touch input as relative coordinate movement information through the touchpad driver 281.

According to an embodiment, the kernel 241 may change coordinate movement information of a touch signal based on the matched coordinate value received from the input manager 293 and may provide the changed information to the window manager 292.

According to various embodiments, a screen output method is performed in an electronic device capable of being connected with an external display device. The method includes detecting whether the electronic device is communicatively connected with the external display device via a communication circuit of the electronic device, transmitting data for rendering an extended user interface on the external display device to the external display device via the communication circuit, detecting whether the electronic device is connected with an external pointing device via the communication circuit, and when the external pointing device is not connected to the electronic device, providing at least a portion of the display for use as a pointing device.

According to various embodiments, the providing of the at least portion of the display as the pointing device includes displaying a first user interface on a first portion of the display for use as the pointing device, and displaying a second user interface on a second portion of the display for user authentication.

According to various embodiments, the displaying the first user interface includes providing direction data for the extended user interface to the external display device based on a touch input on the first portion.

According to various embodiments, the displaying the second user interface includes displaying a guide for using a biometric sensor of the electronic device.

According to various embodiments, the providing of the at least the portion of the display for use as the pointing device includes processing a user input occurred received on the first portion, through a first input driver, and processing a user input occurred received on the second portion, through a second input driver.

Figure 8:
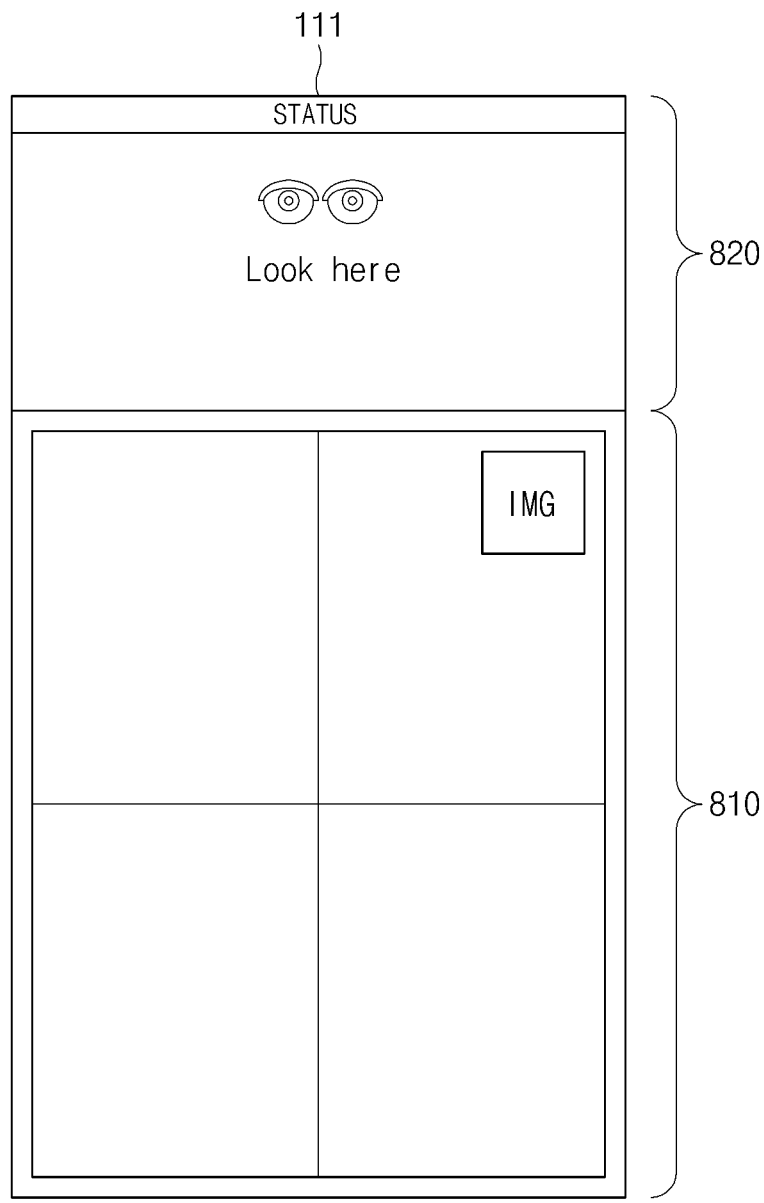
FIG. 8 is a drawing illustrating a screen of a division output mode according to various embodiments.

FIG. 8 is a drawing illustrating a screen of a division output mode according to various embodiments. FIG. 8 is, but is not limited to, an example.

The electronic device according to various embodiments may include all or some of elements of an electronic device 110 of FIG. 2.

Referring to FIG. 8, a processor 220 of FIG. 2 may set at least a portion of a display 111 as a pad region 810, and may set the other of the display 111 as a screen region 820 where a second user interface is output (hereinafter referred to as "a division output mode"). The second user interface may be a user interface output while executing a specified function (or application). For example, the processor 220 may output the pad region 810 (or a first region) on one region (e.g., a lower end) of the display 111 and may output the screen region 820 (or a second region) where the second user interface outputs a guide screen for iris recognition on the other (e.g., an upper end) of the display 111, in a portrait mode.

For example, when a user executes a function, such as payment, in a desktop mode, a guide message (e.g., a pop-up "Look here") or a guide image (e.g., an image of an eye of a user) generated by an application associated with the function may be output on the screen region 820 (or the second region).

According to various embodiments, the processor 220 may store coordinate data (e.g., a reference point, a horizontal size, a vertical size, or the like) of the pad region 810 in a memory 230 of FIG. 2.

According to various embodiments, a touch input occurred on the pad region 810 may be processed by a touchpad driver 281 of a kernel 241 of FIG. 2, and a touch input occurred on the screen region 820 may be processed by a touchscreen driver 282 of the kernel 241.

For example, the touch input occurred on the pad region 810 may be applied to movement of a mouse pointer or cursor on an external display device 130 of FIG. 1 by the touchpad driver 281, and the touch input occurred on the screen region 820 may be applied to a related application executed in the electronic device 110 by the touchscreen driver 282.

Figure 9:
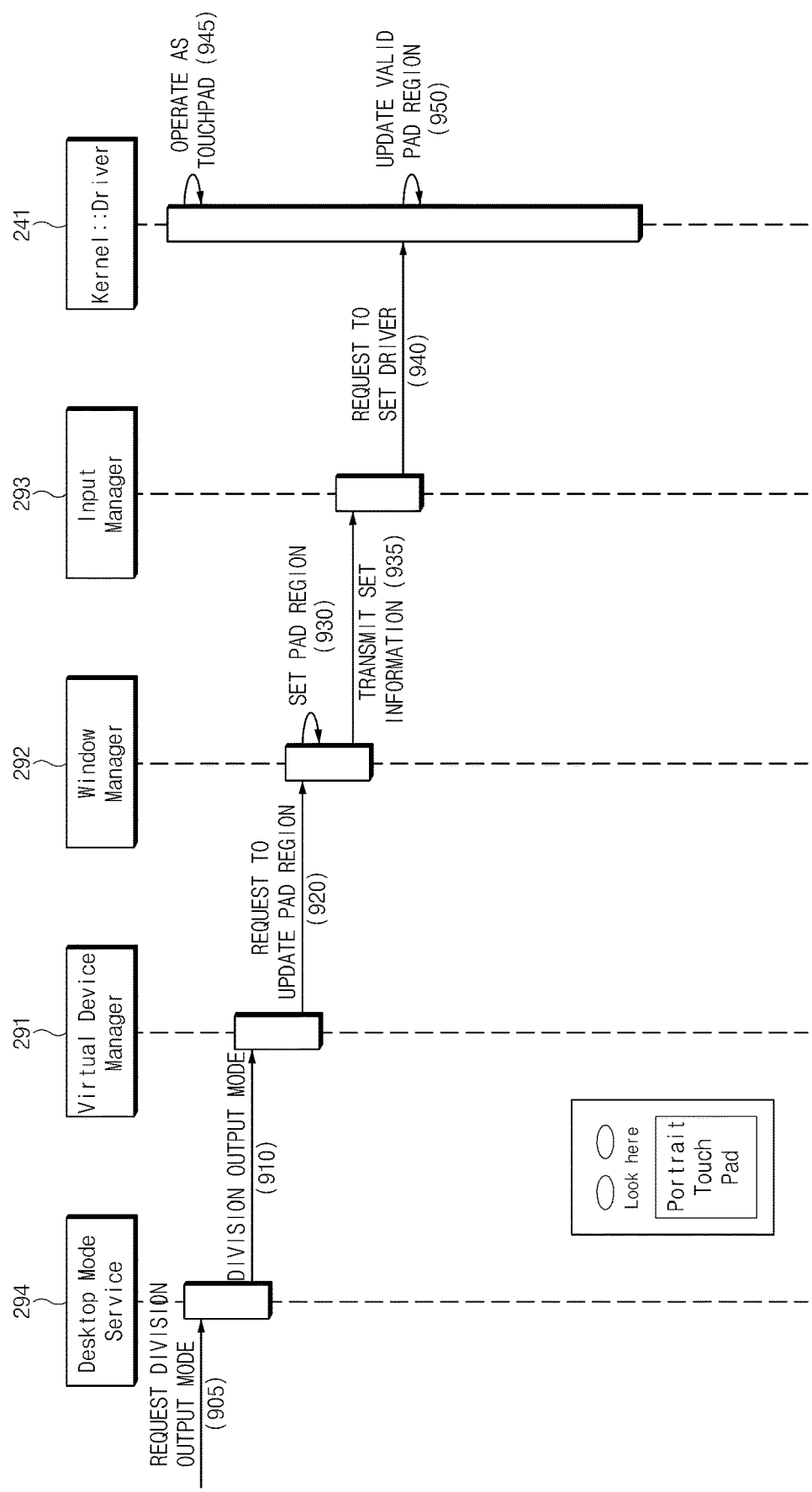
FIG. 9 is a signal sequence diagram illustrating setting of a touchpad in a division output mode according to various embodiments.

FIG. 9 is a signal sequence diagram illustrating setting of a touchpad in a division output mode according to various embodiments.

An electronic device according to various embodiments may include all or some of elements of an electronic device 110 of FIG. 2.

Referring to FIG. 9, in operation 905, in a state where an electronic device 110 of FIG. 1 is operating in a desktop mode and a touchpad (e.g., in a portrait mode), because an external pointing device 140 of FIG. 1 is not connected to the electronic device 110, a desktop mode service 294 may receive a request to enter a division output mode according to an execution of a specified application (e.g., a payment app). Thus, the desktop mode service 294 may initiate a process of updating a pad region.

When receiving the request to enter the division output mode in a state where the external pointing device 140 is not connected to the electronic device 110, in operation 910, the desktop mode service 294 may inform a virtual device manager 291 that it is in the division output mode.

In operation 920, the virtual device manager 291 may transmit a request to update the pad region to a window manager 292.

In operations 930 and 935, the window manager 292 may inform an input manager 293 of information (e.g., a reference point, a horizontal width, or a vertical width) about a pad region (hereinafter referred to as "valid pad region") to be used as a touchpad.

In operation 940, the input manager 293 may request kernel 241 to set a driver corresponding to a touch sensor 250 of FIG. 2 to a touchpad driver 281 of FIG. 2, based on the information about the valid pad region.

In operation 945, the kernel 241 may be in a state where it operates as a touchpad. A signal received from the touch sensor 250 may be processed by the touchpad driver 281.

In operation 950, the kernel 241 may set a touch input occurred on the valid pad region to be processed through the touchpad driver 281. When a user touches the touch sensor 250 on the valid pad region, the kernel 241 may receive information about a location where a touch input occurs or information about a change in touch input as relative coordinate movement information through the touchpad driver 281. The kernel 241 may change coordinate movement information of a touch signal and may provide the changed information to the window manager 292.

According to various embodiments, a touch input occurred on another region except for the valid pad region may be disregarded or may be processed by a touchscreen driver 282 of FIG. 2 to be provided to another application (e.g., a payment app).

Figure 10:
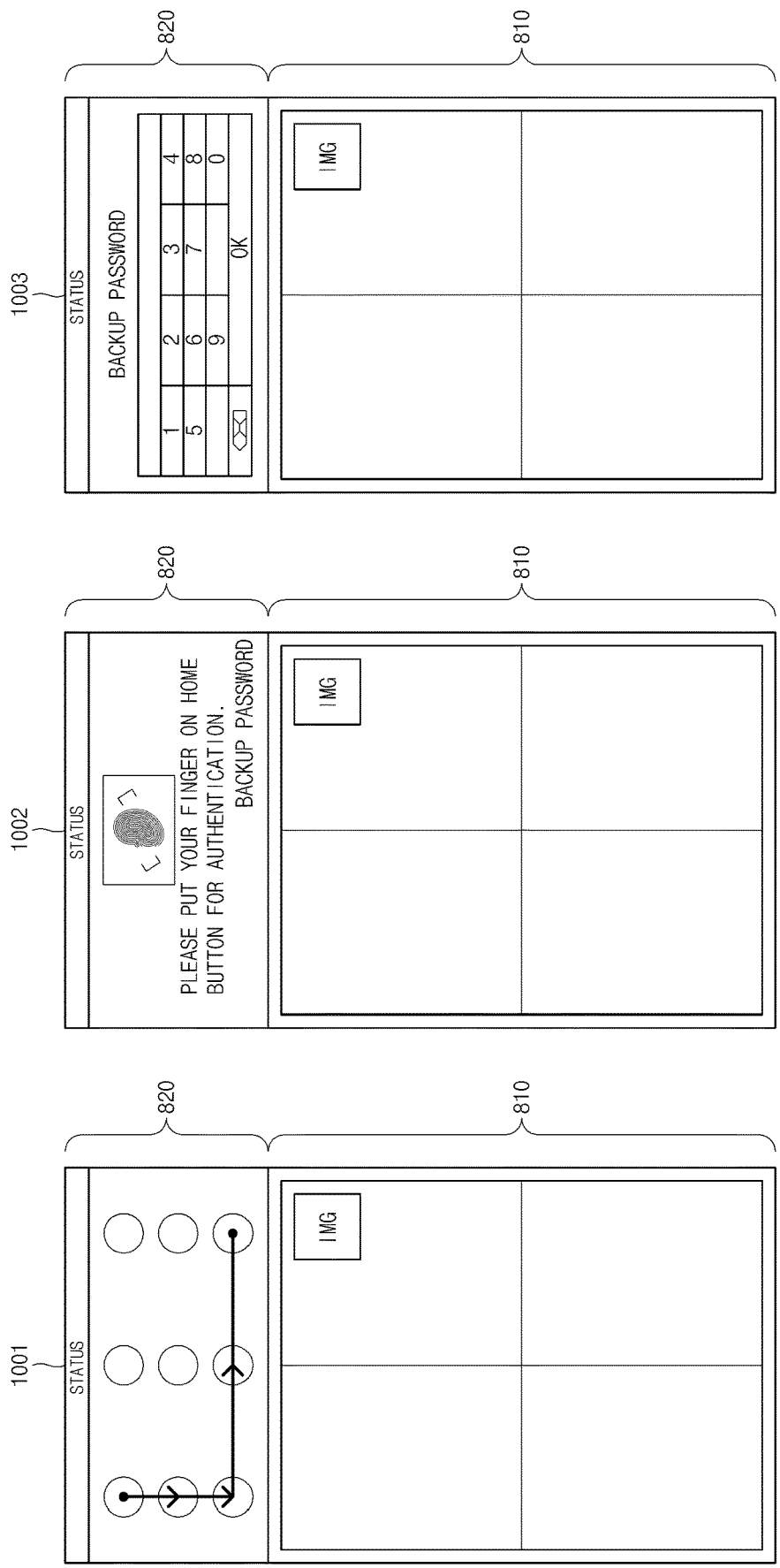
FIG. 10 is a drawing illustrating a second user interface in a division output mode according to various embodiments.

FIG. 10 is a drawing illustrating a second user interface in a division output mode according to various embodiments.

An electronic device according to various embodiments may include all or some of elements of an electronic device 110 of FIG. 2.

Referring to FIG. 10, a processor 220 of FIG. 2 may set at least a portion of a display 111 of FIG. 1 to a pad region 810 and may set the other of the display 111 to a screen region 820 where a second user interface is output. The second user interface may be a user interface output in a process of executing a specified function (or application).

According to various embodiments, a screen for various types of security related content may be output on the screen region 820.

For example, a pattern input screen 1001 for unlocking a screen of the electronic device 110 may be output on the screen region 820. A user may input a predetermined pattern on the pattern input screen 1001. The input of the user may be processed by a touchscreen driver 282 of a kernel 241 of FIG. 2 to be provided to a processor 220 of FIG. 2.

For another example, a guide screen 1002 for fingerprint recognition of the user may be output on the screen region 820. The user may input his or her fingerprint on a fingerprint sensor (e.g., a physical button or the guide screen 1002) in a specified manner. In this case, a touch input of the user, occurred on the screen region 820, may be disregarded or may be processed by the touchscreen driver 282 to be provided to the processor 220.

For another example, a screen 1003 for inputting a password for user authentication may be output on the screen region 820. The user may enter a predetermined password and may proceed with user authentication. The input of the user may be processed by the touchscreen driver 282 of the kernel 241 to be provided to the processor 220. The processor 220 may provide an authentication result to a related application.

FIG. 11 is a drawing illustrating an image output in a division output mode according to various embodiments.

An electronic device according to various embodiments may include all or some of elements of an electronic device 110 of FIG. 2.

Referring to FIG. 11, a DDI 260 may be electrically connected with a display panel (e.g., a display panel 270 of FIG. 2) and may provide an image signal corresponding to image data received from a processor 220 to the display panel 270. The DDI 260 may provide an image signal to the display panel 270 at a specified frame rate.

The DDI 260 may include a graphic random access memory (GRAM) 261.

The DDI 260 may further include an interface module, an image processing unit, a multiplexer, a display timing controller (T-con), a source driver, a gate driver, an oscillator, and/or the like.

The processor 220 may transmit image data corresponding to the image signal to the DDI 260. In an active state, the processor 220 may provide the image data using a relative higher frequency than an inactive state (or a sleep state).

In the inactive state (or the sleep state) of the processor 220, the DDI 260 may provide a corresponding image signal to the display panel 270 at a relatively lower frame rate than the active state (or a wake-up state) of the processor 220 based on image data stored in the embedded GRAM 261.

In this case, the processor 220 may temporarily operate in the active state (or the wake-up state) to provide image information (image data) to the DDI 260. Thereafter, the processor 220 may operate in the inactive state (or the sleep state) and may fail to engage in an internal operation of the DDI 260.

The processor 220 may interact with the DDI 260. For example, the processor 220 may provide image data of content (e.g., a text, an image, a graphic user interface (GUI) object, or the like) output on at least a partial region (e.g., a pad region 810 or a screen region 820) in a touch panel (e.g., a touch sensor 250 of FIG. 2) to the GRAM 261 included in the DDI 260.

The processor 220 may temporarily operate in the active state (or the wake-up state) to provide the image data to the GRAM 261. After providing the image data to the DDI 260, the processor 220 may be changed to the inactive state (or the sleep state).

The processor 220 may provide, for example, image data to the GRAM 261 on a periodic or aperiodic basis. For example, the processor 220 may provide image data (e.g., a digital watch image) updated at intervals of a specified time to the GRAM 261 on a periodic basis. For another example, when a notification occurs, the processor 220 may provide image data indicating the notification (e.g., image data capable of including an icon image of an instant messaging (IM) application) to the GRAM 261 on an aperiodic basis.

According to an embodiment, the DDI 260 may store the image data provided from the processor 220 in the GRAM 261. The DDI 260 may convert the image data stored in the GRAM 261 into an image signal depending to an internal setting or control information received from the processor 220. The image signal may be provided to the display panel 270 by the DDI 260, and content (e.g., a text, an image, a GUI object, or the like) may be output on at least a partial region (e.g., the pad region 810 or the screen region 820) in the display panel 270 through the image signal.

For example, the DDI 260 may receive one image data including content, such as an icon, a number, and an image, from the processor 220 which operates in the active state (or the wake-up state). After providing the one image data to the DDI 260, the processor 220 may be changed to the inactive state (or the sleep state).

Thereafter, in the inactive state (or the sleep state) of the processor 220, the DDI 260 may combine control information received from the processor 220 (e.g., control information indicating notification content) with an icon, a number, an image, or the like included in previously received one image data. The DDI 260 may output and/or update the combined result image to the display panel 270 using an internal operation.

According to various embodiments, in a division output mode, the GRAM 261 may be divided into a plurality of storage areas (e.g., a first storage area 261*a* and a second storage area 261*b*). The GRAM 261 may separately store a storage area which is responsible for each region (e.g., the pad region 810 or the screen region 820) of the display panel 270. The DDI 260 may transmit image data stored in each storage area to the display panel 270 at a different rate.

For example, the DDI 260 may transmit an image signal to the screen region for guiding iris recognition at a relatively fast frame rate (e.g., the same frame rate as that in the active state of the processor 220) to provide a fast response to an input of a user. On the other hand, the DDI 260 may transmit an image signal to the pad region 810 which operates as a touchpad at a relatively low frame rate. Since the pad region 810 has a relatively small change in content, the DDI 260 may transmit an image signal at the same frame rate as that in the inactive state of the processor 220. Thus, power consumption may be reduced.

Figure 12:
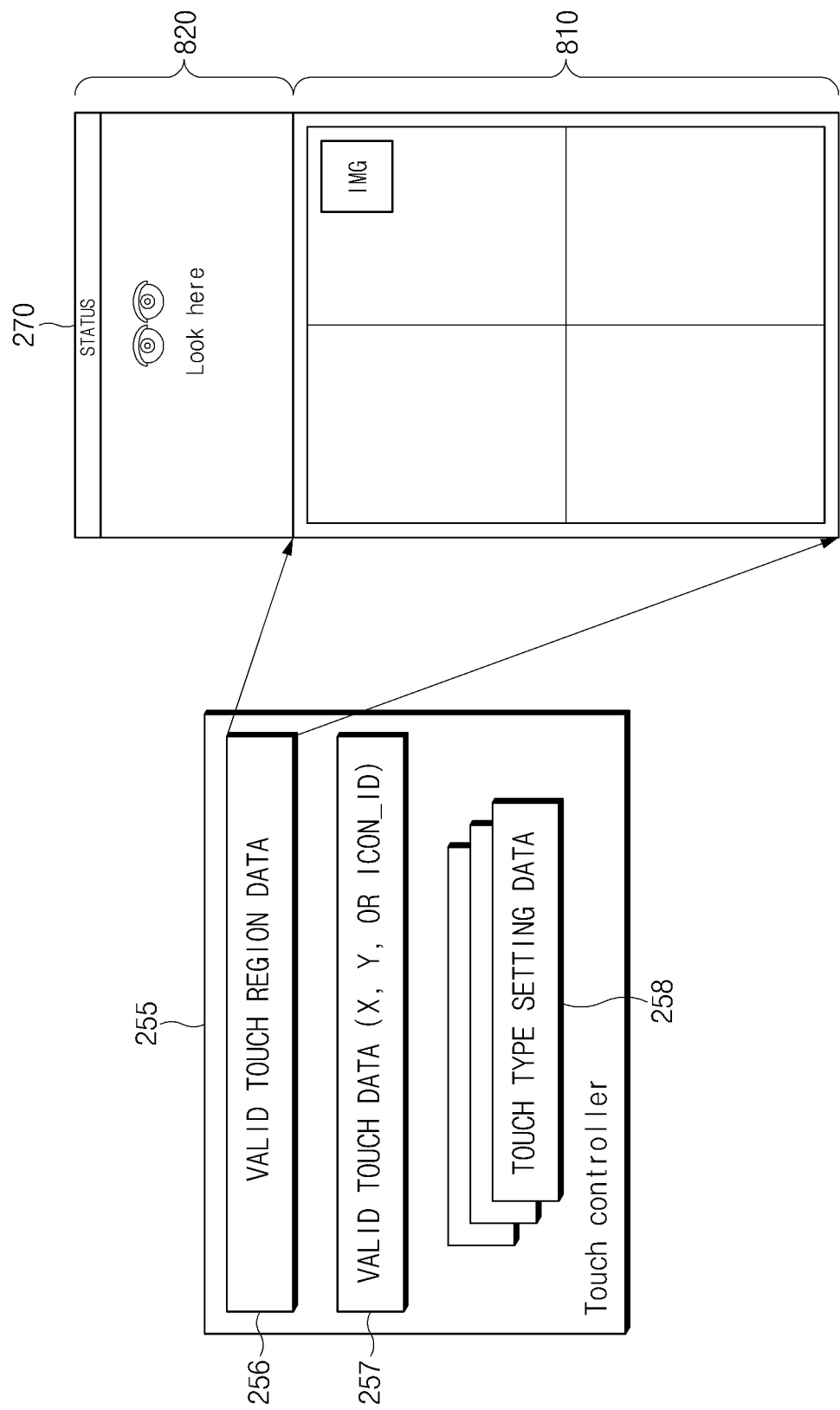
FIG. 12 is a drawing illustrating a touch controller according to various embodiments.

FIG. 12 is a drawing illustrating a touch controller according to various embodiments.

The electronic device according to various embodiments may include all or some of elements of an electronic device 110 of FIG. 2.

Referring to FIG. 12, a touch controller 255 may include registers or memories. The registers or memories may store data 256 about a valid pad region in a division output mode. The valid pad region data 256 may include reference point coordinates (X, Y), width data W, and height data H. In various embodiments, the information or data 256 about a valid range may be represented with a byte based on a pixel included in a display panel 270.

According to various embodiments, the touch controller 255 may transmit a touch input occurred within a pad region 810 determined according to the information or data 256 about the valid range to a kernel 241 of FIG. 2 and may disregard a touch input occurred on a region except for the pad region 810, thus reducing power consumption.

According to various embodiments, the touch controller 255 may store valid touch data 257. The valid touch data 257 may include coordinate data (X, Y) of a location where a valid touch is performed. The coordinate data may be read by a processor 220 of FIG. 2.

The valid touch data 257 may include identification information Icon_ID of a "division region" where a valid touch is performed, in a specified region to detect the valid touch. The identification information may include information 258 about a type of the valid touch. The information 258 about the type may include a double touch including a first touch and a second touch, a touch-down performed during a specified time or more, and a pressure touch performed with specified pressure or more, a proximity touch (hovering), or the like.

Figure 13:
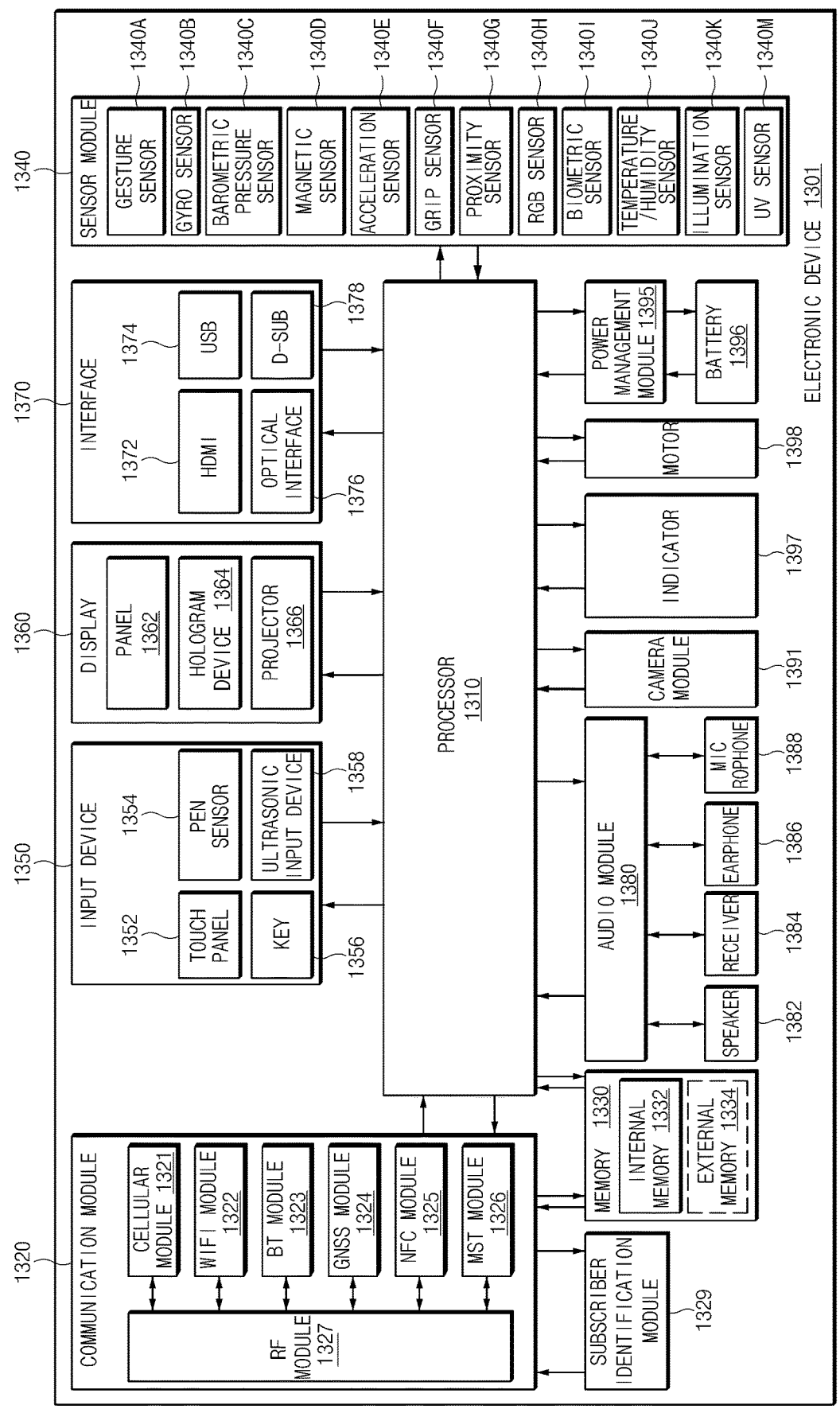
FIG. 13 is a block diagram illustrating a configuration of an electronic device according to various embodiments.

FIG. 13 is a block diagram illustrating an electronic device according to an embodiment of the present disclosure.

Referring to FIG. 13, an electronic device 1301 may include, for example, a part or the entirety of the electronic device 110 illustrated in FIG. 1. The electronic device 1301 may include at least one processor (e.g., AP) 1310, a communication module 1320, a subscriber identification module (SIM) 1329, a memory 1330, a sensor module 1340, an input device 1350, a display 1360, an interface 1370, an audio module 1380, a camera module 1391, a power management module 1395, a battery 1396, an indicator 1397, and a motor 1398.

The processor 1310 may run an operating system or an application program so as to control a plurality of hardware or software elements connected to the processor 1310, and may process various data and perform operations. The processor 1310 may be implemented with, for example, a system on chip (SoC). According to an embodiment of the present disclosure, the processor 1310 may further include a graphic processing unit (GPU) and/or an image signal processor. The processor 1310 may include at least a portion (e.g., a cellular module 1321) of the elements illustrated in FIG. 13. The processor 1310 may load, on a volatile memory, an instruction or data received from at least one of other elements (e.g., a nonvolatile memory) to process the instruction or data, and may store various data in a nonvolatile memory.

The communication module 1320 may have a configuration that is the same as or similar to that of the communication circuit 225 of FIG. 2. The communication module 1320 may include, for example, a cellular module 1321, a Wi-Fi module 1322, a Bluetooth (BT) module 1323, a GNSS module 1324 (e.g., a GPS module, a GLONASS module, a BeiDou module, or a Galileo module), a NFC module 1325, MST module 1326, and a radio frequency (RF) module 1327.

The cellular module 1321 may provide, for example, a voice call service, a video call service, a text message service, or an Internet service through a communication network. The cellular module 1321 may identify and authenticate the electronic device 1301 in the communication network using the subscriber identification module 1329 (e.g., a SIM card). The cellular module 1321 may perform at least a part of functions that may be provided by the processor 1310. The cellular module 1321 may include a communication processor (CP).

Each of the Wi-Fi module 1322, the Bluetooth module 1323, the GNSS module 1324 and the NFC module 1325 may include, for example, a processor for processing data transmitted/received through the modules. According to some various embodiments of the present disclosure, at least a part (e.g., two or more) of the cellular module 1321, the Wi-Fi module 1322, the Bluetooth module 1323, the GNSS module 1324, and the NFC module 1325 may be included in a single integrated chip (IC) or IC package.

The RF module 1327 may transmit/receive, for example, communication signals (e.g., RF signals). The RF module 1327 may include, for example, a transceiver, a power amp module (PAM), a frequency filter, a low noise amplifier (LNA), an antenna, or the like. According to another embodiment of the present disclosure, at least one of the cellular module 1321, the Wi-Fi module 1322, the Bluetooth module 1323, the GNSS module 1324, or the NFC module 1325 may transmit/receive RF signals through a separate RF module.

The SIM 1329 may include, for example, an embedded SIM and/or a card containing the subscriber identity module, and may include unique identification information (e.g., an integrated circuit card identifier (ICCID)) or subscriber information (e.g., international mobile subscriber identity (IMSI)).

The memory 1330 (e.g., the memory 230) may include, for example, an internal memory 1332 or an external memory 1334. The internal memory 1332 may include at least one of a volatile memory (e.g., a dynamic RAM (DRAM), a static RAM (SRAM), a synchronous dynamic RAM (SDRAM), or the like), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 1334 may include a flash drive such as a compact flash (CF), a secure digital (SD), a Micro-SD, a Mini-SD, an extreme digital (xD), a MultiMediaCard (MMC), a memory stick, or the like. The external memory 1334 may be operatively and/or physically connected to the electronic device 1301 through various interfaces.

The sensor module 1340 may, for example, measure physical quantity or detect an operation state of the electronic device 1301 so as to convert measured or detected information into an electrical signal. The sensor module 1340 may include, for example, at least one of a gesture sensor 1340A, a gyro sensor 1340B, a barometric pressure sensor 1340C, a magnetic sensor 1340D, an acceleration sensor 1340E, a grip sensor 1340F, a proximity sensor 1340G, a color sensor 1340H (e.g., a red/green/blue (RGB) sensor), a biometric sensor 1340I, a temperature/humidity sensor 1340J, an illumination sensor 1340K, or an ultraviolet (UV) sensor 1340M. Additionally or alternatively, the sensor module 1340 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 1340 may further include a control circuit for controlling at least one sensor included therein. In some various embodiments of the present disclosure, the electronic device 1301 may further include a processor configured to control the sensor module 1340 as a part of the processor 1310 or separately, so that the sensor module 1340 is controlled while the processor 1310 is in a sleep state.

The input device 1350 may include, for example, a touch panel 1352, a (digital) pen sensor 1354, a key 1356, or an ultrasonic input device 1358. The touch panel 1352 may employ at least one of capacitive, resistive, infrared, and ultraviolet sensing methods. The touch panel 1352 may further include a control circuit. The touch panel 1352 may further include a tactile layer so as to provide a haptic feedback to a user.

The (digital) pen sensor 1354 may include, for example, a sheet for recognition which is a part of a touch panel or is separate. The key 1356 may include, for example, a physical button, an optical button, or a keypad. The ultrasonic input device 1358 may sense ultrasonic waves generated by an input tool through a microphone 1388 so as to identify data corresponding to the ultrasonic waves sensed.

The display 1360 (e.g., the display panel 270) may include a panel 1362, a hologram device 1364, or a projector 1366. The panel 1362 may have a configuration that is the same as or similar to that of the display panel 270 of FIG. 2. The panel 1362 may be, for example, flexible, transparent, or wearable. The panel 1362 and the touch panel 1352 may be integrated into a single module. The hologram device 1364 may display a stereoscopic image in a space using a light interference phenomenon. The projector 1366 may project light onto a screen so as to display an image. The screen may be disposed in the inside or the outside of the electronic device 1301. According to an embodiment of the present disclosure, the display 1360 may further include a control circuit for controlling the panel 1362, the hologram device 1364, or the projector 1366.

The interface 1370 may include, for example, an HDMI 1372, a USB 1374, an optical interface 1376, or a D-sub-miniature (D-sub) 1378. The interface 1370, for example, may be included in the communication circuit 225 illustrated in FIG. 2. Additionally or alternatively, the interface 1370 may include, for example, a mobile high-definition link (MHL) interface, an SD card/multi-media card (MMC) interface, or an infrared data association (IrDA) interface.

The audio module 1380 may convert, for example, a sound into an electrical signal or vice versa. The audio module 1380 may process sound information input or output through a speaker 1382, a receiver 1384, an earphone 1386, or the microphone 1388.

The camera module 1391 is, for example, a device for shooting a still image or a video. According to an embodiment of the present disclosure, the camera module 1391 may include at least one image sensor (e.g., a front sensor or a rear sensor), a lens, an image signal processor (ISP), or a flash (e.g., an LED or a xenon lamp).

The power management module 1395 may manage power of the electronic device 1301. According to an embodiment of the present disclosure, the power management module 1395 may include a power management integrated circuit (PMIC), a charger integrated circuit (IC), or a battery or gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 1396 and a voltage, current or temperature thereof while the battery is charged. The battery 1396 may include, for example, a rechargeable battery and/or a solar battery.

The indicator 1397 may display a specific state of the electronic device 1301 or a part thereof (e.g., the processor 1310), such as a booting state, a message state, a charging state, or the like. The motor 1398 may convert an electrical signal into a mechanical vibration, and may generate a vibration or haptic effect. Although not illustrated, a processing device (e.g., a GPU) for supporting a mobile TV may be included in the electronic device 1301. The processing device for supporting a mobile TV may process media data according to the standards of digital multimedia broadcasting (DMB), digital video broadcasting (DVB), Media-FLO™, or the like.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

According to various embodiments, an electronic device includes a housing including a first surface and a second surface facing an opposite direction from the first surface, a display configured to receive a touch input, the display exposed through at least a portion of the first surface, a communication circuit disposed in the housing, at least one processor disposed in the housing and electrically connected with the display and the communication circuit, and a memory disposed in the housing and electrically connected with the at least one processor, wherein the memory stores instructions executable to cause the at least one processor to detect whether the electronic device is in communication with an external display device via the communication circuit, transmit data for rendering an extended user interface on the external display device to the external display device via the communication circuit, detect whether the electronic device is connected with an external pointing device via the communication circuit, and when the external pointing device is not connected to the electronic device, provide at least a portion of the display for use as a pointing device.

According to various embodiments, the instructions cause the at least one processor to display a first user interface for the pointing device on a first portion of the display, and display a second user interface for user authentication on a second portion of the display.

According to various embodiments, the instructions cause the at least one processor to provide direction data for the extended user interface to the external display device based on a touch input on the first portion.

According to various embodiments, the electronic device further includes a biometric sensor exposed through another portion of the first surface, wherein the second user interface includes display of a guide for using the biometric sensor.

According to various embodiments, the biometric sensor comprises at least one of an iris sensor or a fingerprint sensor.

According to various embodiments, the instructions cause the at least one processor to when the at least the portion of the display is used as the pointing device, display a black touch region on the at least the portion of the display.

According to various embodiments, the instructions cause the at least one processor to process a user input received on the first portion, through a first input driver, and process a user input received on the second portion, through a second input driver.

According to various embodiments, the instructions cause the at least one processor to disregard a user input received through the second user interface.

According to various embodiments, the electronic device further includes a display driver integrated circuit (DDI) configured to provide an image signal to the display, the DDI comprising a graphic random access memory (GRAM), wherein the instructions cause the at least one processor to control the GRAM to separately store first image data for the first portion and second image data for the second portion.

According to various embodiments, the instructions cause the at least one processor to control the DDI to display the first image data and the second image data on the display at different frame rates.

According to various embodiments, the instructions cause the at least one processor to when the at least the portion of the display operates as the pointing device and the external pointing device is recognized, terminate operation of the display as the pointing device.

According to various embodiments, the instructions cause the at least one processor to when at least the portion of the display operates as the pointing device and a user input is not detected to the display for a prespecified time, terminate operation of the display as the pointing device.

According to various embodiments, the instructions cause the at least one processor to display on the display a region operable as the pointing device.

According to various embodiments, the instructions cause the at least one processor to set the display to operate as the pointing device in a landscape mode, and responsive to receiving an input from a user requesting a change to a portrait mode, setting the display to operate as the pointing device in the portrait mode.

According to various embodiments, an electronic device includes a display configured to receive a touch input, a communication circuit, a processor, and a memory, wherein the processor is configured to detect a connection with an external display device via the communication circuit, detect whether a specified external pointing device is connected to the electronic device via the communication circuit; and when the external pointing device is not connected to the electronic device, operate at least a portion of the display as a pointing device.

Figure 14:
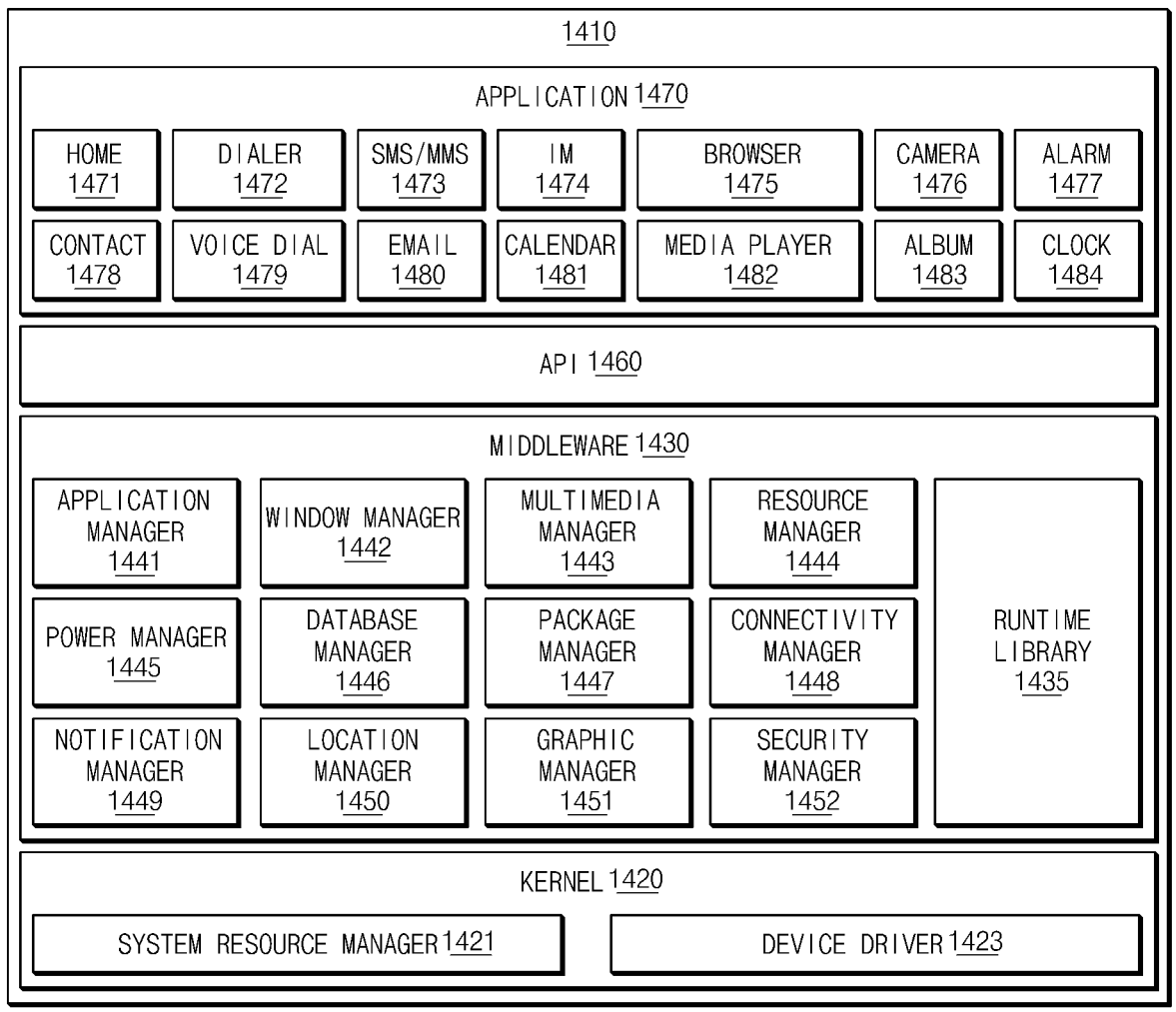
FIG. 14 is a block diagram illustrating a configuration of a program module according to various embodiments.

FIG. 14 is a block diagram illustrating a program module according to an embodiment of the present disclosure.

Referring to FIG. 14, a program module 1410 may include an operating system (OS) for controlling a resource related to an electronic device (e.g., the electronic device 110) and/or various applications running on the OS. The operating system may be, for example, Android, iOS, Windows, Symbian, Tizen, or the like.

The program module 1410 may include a kernel 1420, a middleware 1430, an API 1460, and/or an application 1470. At least a part of the program module 1410 may be preloaded on an electronic device or may be downloaded from an external electronic device.

The kernel 1420 may include, for example, a system resource manager 1421 or a device driver 1423. The system resource manager 1421 may perform control, allocation, or retrieval of a system resource. According to an embodiment of the present disclosure, the system resource manager 1421 may include a process management unit, a memory management unit, a file system management unit, or the like. The device driver 1423 may include, for example, a display driver, a camera driver, a Bluetooth driver, a shared memory driver, a USB driver, a keypad driver, a Wi-Fi driver, an audio driver, or an inter-process communication (IPC) driver.

The middleware 1430, for example, may provide a function that the applications 1470 require in common, or may provide various functions to the applications 1470 through the API 1460 so that the applications 1470 may efficiently use limited system resources in the electronic device. According to an embodiment of the present disclosure, the middleware 1430 may include at least one of a runtime library 1435, an application manager 1441, a window manager 1442, a multimedia manager 1443, a resource manager 1444, a power manager 1445, a database manager 1446, a package manager 1447, a connectivity manager 1448, a notification manager 1449, a location manager 1450, a graphic manager 1451, and a security manager 1452.

The runtime library 1435 may include, for example, a library module that a complier uses to add a new function through a programming language while the application 1470 is running. The runtime library 1435 may perform a function for input/output management, memory management, or an arithmetic function.

The application manager 1441 may mange, for example, a life cycle of at least one of the applications 1470. The window manager 1442 may manage a GUI resource used in a screen. The multimedia manager 1443 may recognize a format required for playing various media files and may encode or decode a media file using a codec matched to the format. The resource manager 1444 may manage a resource such as a source code, a memory, or a storage space of at least one of the applications 1470.

The power manager 1445, for example, may operate together with a basic input/output system (BIOS) to manage a battery or power and may provide power information required for operating the electronic device. The database manager 1446 may generate, search, or modify a database to be used in at least one of the applications 1470. The package manager 1447 may manage installation or update of an application distributed in a package file format.

The connectivity manager 1448 may manage wireless connection of Wi-Fi, Bluetooth, or the like. The notification manager 1449 may display or notify an event such as message arrival, appointments, and proximity alerts in such a manner as not to disturb a user. The location manager 1450 may manage location information of the electronic device. The graphic manager 1451 may manage a graphic effect to be provided to a user or a user interface related thereto. The security manager 1452 may provide various security functions required for system security or user authentication. According to an embodiment of the present disclosure, in the case in which an electronic device (e.g., the electronic device 110) includes a phone function, the middleware 1430 may further include a telephony manager for managing a voice or video call function of the electronic device.

The middleware 1430 may include a middleware module for forming a combination of various functions of the above-mentioned elements. The middleware 1430 may provide a module specialized for each type of an operating system to provide differentiated functions. Furthermore, the middleware 1430 may delete a part of existing elements or may add new elements dynamically.

The API 1460 which is, for example, a set of API programming functions may be provided in different configurations according to an operating system. For example, in the case of Android or iOS, one API set may be provided for each platform, and, in the case of Tizen, at least two API sets may be provided for each platform.

The application 1470, for example, may include at least one application capable of performing functions such as a home 1471, a dialer 1472, an SMS/MMS 1473, an instant message (IM) 1474, a browser 1475, a camera 1476, an alarm 1477, a contact 1478, a voice dial 1479, an e-mail 1480, a calendar 1481, a media player 1482, an album 1483, a clock 1484, health care (e.g., measure an exercise amount or blood sugar), or environmental information provision (e.g., provide air pressure, humidity, or temperature information).

According to an embodiment of the present disclosure, the application 1470 may include an information exchange application for supporting information exchange between the electronic device (e.g., the electronic device 110) and an external electronic device. The information exchange application may include, for example, a notification relay application for relaying specific information to the external electronic device or a device management application for managing the external electronic device.

For example, the notification relay application may have a function for relaying, to an external electronic device, notification information generated in another application (e.g., an SMS/MMS application, an e-mail application, a health care application, an environmental information application, or the like) of the electronic device. Furthermore, the notification relay application may receive notification information from the external electronic device and may provide the received notification information to the user.

The device management application, for example, may manage (e.g., install, delete, or update) at least one function (e.g., turn-on/turn off of the external electronic device itself (or some elements) or the brightness (or resolution) adjustment of a display) of the external electronic device communicating with the electronic device, an application running in the external electronic device, or a service (e.g., a call service, a message service, or the like) provided from the external electronic device.

According to an embodiment of the present disclosure, the application 1470 may include a specified application (e.g., a healthcare application of a mobile medical device) according to an attribute of the external electronic device. The application 1470 may include an application received from an external electronic device. The application 1470 may include a preloaded application or a third-party application downloadable from a server. The names of the elements of the program module 1410 illustrated may vary with the type of an operating system.

According to various embodiments of the present disclosure, at least a part of the program module 1410 may be implemented with software, firmware, hardware, or a combination thereof. At least a part of the program module 1410, for example, may be implemented (e.g., executed) by a processor (e.g., the processor 1310). At least a part of the program module 1410 may include, for example, a module, a program, a routine, sets of instructions, or a process for performing at least one function.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 220), the processor may perform functions corresponding to the instructions. The computer-readable storage medium may be, for example, the memory 230.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. A mobile terminal apparatus, comprising:
a housing including a first surface and a second surface facing an opposite direction from the first surface;
a display configured to receive a touch input, the display exposed through at least a portion of the first surface;
a communication circuit disposed in the housing;
memory disposed in the housing; and
at least one processor disposed in the housing and electrically connected with the display, the communication circuit, and the memory,
wherein the memory stores instructions which, when executed by the at least one processor, cause the mobile terminal apparatus to:
display a screen including a first user interface for executing a desktop mode and a second user interface for a screen mirroring on the display, when the mobile terminal apparatus is connected to an external display device,
receive a user input selecting the first user interface,
executing the desktop mode in response to the user input, and
while executing the desktop mode and while the mobile terminal apparatus is in communication with an external display device:
configure a display screen of the mobile terminal apparatus for displaying on the external display device, and
transmit data for rendering the display screen on the external display device to the external display device via the communication circuit.

2. The mobile terminal apparatus of claim 1, wherein the instructions cause the mobile terminal apparatus to:
display on a first portion of the display a control interface used as a touch pad for controlling a pointing cursor provided over the display screen of the mobile terminal apparatus displayed on the external display device; and
display on a second portion of the display a keypad used for receiving alphanumeric input data from a user, wherein the control interface for the touch pad and the keypad are displayed simultaneously.

3. The mobile terminal apparatus of claim 2, wherein the instructions cause the mobile terminal apparatus to:
display a second user interface for the touch pad on the first portion of the display.

4. The mobile terminal apparatus of claim 2, wherein the instructions cause the mobile terminal apparatus to:
provide direction data for the display screen to the external display device based on a particular touch input on the first portion.

5. The mobile terminal apparatus of claim 2, wherein the instructions cause the mobile terminal apparatus to:
when the first portion of the display is used as the touch pad, display a black touch region on at least the portion of the display.

6. The mobile terminal apparatus of claim 2, wherein the instructions cause the mobile terminal apparatus to:
when the first portion of the display operates as the touch pad and an external pointing device is recognized, terminate operation of the display as the touch pad.

7. The mobile terminal apparatus of claim 2, wherein the instructions cause the mobile terminal apparatus to:

when the first portion of the display operates as the touch pad and a user input is not detected to the display for a prespecified time, terminate operation of the display as the touch pad.

8. The mobile terminal apparatus of claim 2, wherein the instructions cause the mobile terminal apparatus to:
display on the display a region operable as the touch pad.

9. The mobile terminal apparatus of claim 2, wherein the instructions cause the mobile terminal apparatus to:
set the display to operate as the touch pad in a landscape mode; and
responsive to receiving an input from the user requesting a change to a portrait mode, setting the display to operate as the touch pad in the portrait mode.

10. The mobile terminal apparatus of claim 2, wherein the instructions are further executable to cause the mobile terminal apparatus to:
based on detecting that the external pointing device is connected to the mobile terminal apparatus to control the pointing cursor displayed on the external display device, deactivating the display of the mobile terminal apparatus including terminating use of the portion of the display as the touch pad.

11. The mobile terminal apparatus of claim 1, wherein the instructions cause the mobile terminal apparatus to:
receive a user input selecting the second user interface; and
transmit data for rendering a screen identical to a screen displayed on the display of the mobile terminal apparatus to the external display device via the communication circuit.

12. A screen output method in a mobile terminal apparatus capable connection with an external display device, the method comprising:
display a screen including a first user interface for executing a desktop mode and a second user interface for a screen mirroring on the display when the mobile terminal apparatus is connected to the external display device;
receiving a user input selecting the first user interface;
executing the desktop mode in response to the user input;
while executing the desktop mode and while the mobile terminal apparatus is communicatively connected with the external display device via a communication circuit of the mobile terminal apparatus:
configuring a display screen of the mobile terminal apparatus for displaying on the external display device; and
transmitting data for rendering the display screen on the external display device to the external display device via the communication circuit.

13. The method of claim 12, further comprising:
displaying on a first portion of the display a control interface used as a touch pad for controlling a pointing cursor provided over display screen of the mobile terminal apparatus displayed on the external display device; and displaying on a second portion of the display a keypad used for receiving alphanumeric input data from a user, wherein the control interface for the touch pad and the keypad are displayed simultaneously.

14. The method of claim 13, wherein the providing of the first portion of the display for use as the touch pad comprises:
displaying a first user interface for the touch pad on the first portion of the display.

15. The method of claim 14, wherein the displaying the first user interface comprises:
providing direction data for the display screen to the external display device based on a touch input on the first portion.

16. The method of claim 14, wherein the providing of the first portion of the display for use as the touch pad comprises:
processing a user input received on the first portion through a first input driver.

17. The method of claim 13, further comprising:
when the first portion of the display is used as the touch pad, displaying a black touch region on at least the portion of the display.

18. The method of claim 13, further comprising:
when the first portion of the display operates as the touch pad and an external pointing device is recognized, terminating operation of the display as the touch pad.

19. The method of claim 13, further comprising:
when the first portion of the display operates as the touch pad and a user input is not detected to the display for a prespecified time, terminating operation of the display as the touch pad.

20. The method of claim 13, further comprising:
setting the display to operate as the touch pad in a landscape mode; and
responsive to receiving an input from the user requesting a change to a portrait mode, setting the display to operate as the touch pad in the portrait mode.

21. The screen output method of claim 13, further comprising:
based on detecting that the external pointing device is connected to the mobile terminal apparatus to control the pointing cursor displayed on the external display device, deactivating the display of the mobile terminal apparatus including terminating use of the portion of the display as the touch pad.

22. The screen output method of claim 12, further comprising:
receiving a user input selecting the second user interface; and
transmitting data for rendering a screen identical to a screen displayed on the display of the mobile terminal apparatus to the external display device via the communication circuit.

* * * * *